(12) United States Patent
Nakagami

(10) Patent No.: US 9,973,766 B2
(45) Date of Patent: May 15, 2018

(54) IMAGE PROCESSING DEVICE, IMAGE PROCESSING METHOD AND COMPUTER-READABLE MEDIUM

(71) Applicant: SONY CORPORATION, Tokyo (JP)

(72) Inventor: Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 120 days.

(21) Appl. No.: 14/905,428

(22) PCT Filed: Apr. 10, 2015

(86) PCT No.: PCT/JP2015/002033
§ 371 (c)(1),
(2) Date: Jan. 15, 2016

(87) PCT Pub. No.: WO2015/194078
PCT Pub. Date: Dec. 23, 2015

(65) Prior Publication Data
US 2016/0165243 A1    Jun. 9, 2016

(30) Foreign Application Priority Data

Jun. 19, 2014  (JP) .................. 2014-125966

(51) Int. Cl.
*H04N 19/34*   (2014.01)
*H04N 19/70*   (2014.01)
(Continued)

(52) U.S. Cl.
CPC ............ *H04N 19/34* (2014.11); *H04N 19/33* (2014.11); *H04N 19/463* (2014.11);
(Continued)

(58) Field of Classification Search
None
See application file for complete search history.

(56) References Cited

U.S. PATENT DOCUMENTS

| 5,412,428 A * | 5/1995 | Tahara .................... H04N 7/54 375/240.25 |
| 2015/0103902 A1* | 4/2015 | Li ......................... H04N 19/30 375/240.12 |

FOREIGN PATENT DOCUMENTS

| WO | WO 2015/057656 A1 | 4/2015 |
| WO | WO 2015/161268 A1 | 10/2015 |

OTHER PUBLICATIONS

Bross, et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29/WG11, Jan. 14-23, 2013, pp. i-298, $12^{th}$ Meeting: Geneva, CH.

Touze, et al., High Dynamic Range Video Distribution Using Existing Video Codecs, 2013, pp. 349-352, IEEE.

Oct. 24, 2017, Japanese Office Action issued for related JP application No. 2014-125966.

Li et al., Non-SCE1: Asymmetric 3D LUT for Color Gamut Scalability, Joint Collaborative Team on Video Coding (JCT-VC) of ITU-T SG 16 WP 3 and ISO/IEC JTC 1/SC 29/WG 11, Jan. 9-17, 2014, pp. 1-7, $16^{th}$ Meeting, San Jose, USA.

(Continued)

*Primary Examiner* — Peter D Le
(74) *Attorney, Agent, or Firm* — Paratus Law Group, PLLC

(57) ABSTRACT

There is provided an image processing device including circuitry configured to predict, from an image of a first layer, an image of a second layer having a different pixel attribute from the first layer, by using a lookup table in which a combination of a luma component, a first chroma component, and a second chroma component of the first layer is mapped to a predicted pixel value of the second layer corresponding to the combination, wherein a predicted value of a luma component of the second layer is acquired by using a first lookup table, and a predicted value of a first chroma component of the second layer is acquired by using a second lookup table with granularity different from granularity of the first lookup table.

10 Claims, 26 Drawing Sheets

(51) Int. Cl.
*H04N 19/96* (2014.01)
*H04N 19/463* (2014.01)
*H04N 19/33* (2014.01)
*H04N 19/59* (2014.01)
*H04N 19/105* (2014.01)
*H04N 19/159* (2014.01)
*H04N 19/186* (2014.01)
*H04N 19/187* (2014.01)

(52) U.S. Cl.
CPC ............ *H04N 19/59* (2014.11); *H04N 19/70* (2014.11); *H04N 19/96* (2014.11); *H04N 19/105* (2014.11); *H04N 19/159* (2014.11); *H04N 19/186* (2014.11); *H04N 19/187* (2014.11)

(56) References Cited

OTHER PUBLICATIONS

Wu et al., Study on Inter-layer Prediction in Bit-depth Scalability, Joint Video Team (JVT) of ISO/IEC MPEG & ITU-T VCEG (ISO/IEC JTC1/SC29/WG11 and ITU-T SG16 Q. 6), Jun. 29-Jul. 5, 2007, pp. 1-13, 24th Meeting, Geneva, CH.

Li et al., SCE1.2: Color gamut scalability with asymmetric 3D LUT, Joint Collaborative Team on Video Coding (JCT-VC) of ITU-T SG 16 WP 3 and ISO/IEC JTC 1/SC 29/WG 11, Mar. 27-Apr. 4, 2014, pp. 1-7, 17th Meeting, Valencia, ES.

Jan. 16, 2018, Japanese Office Action issued for related JP application No. 2014-125966.

* cited by examiner

[Fig. 1]
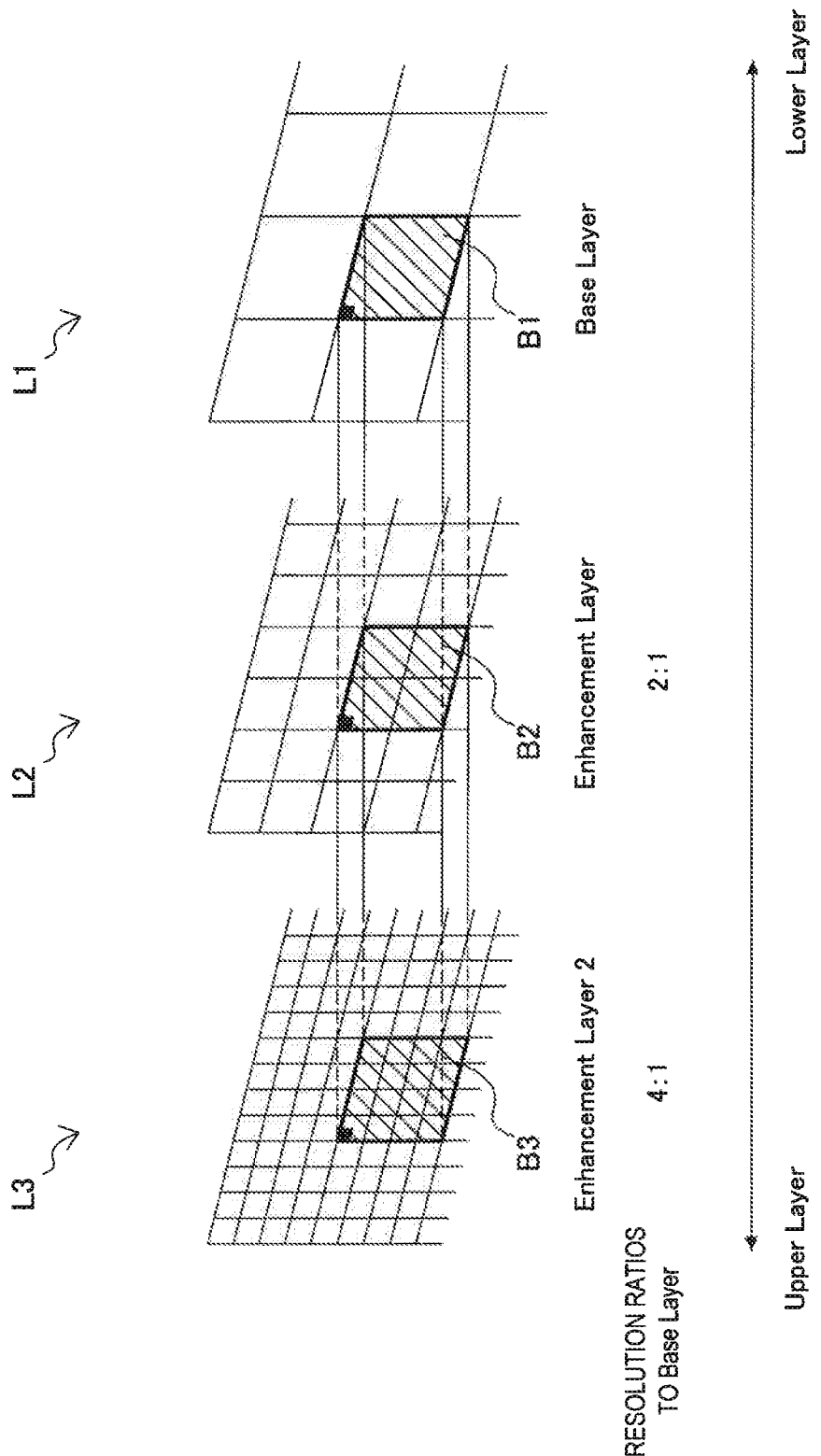

[Fig. 2]
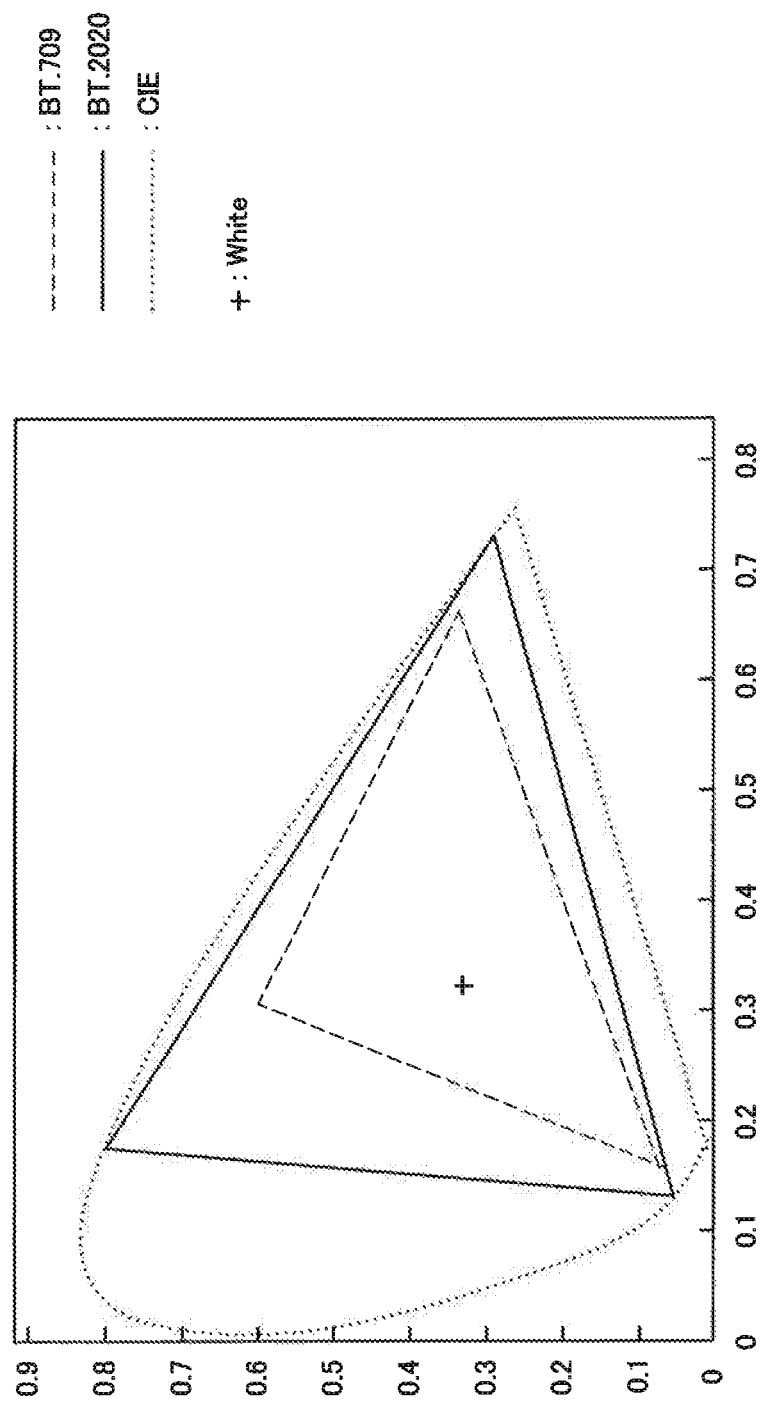

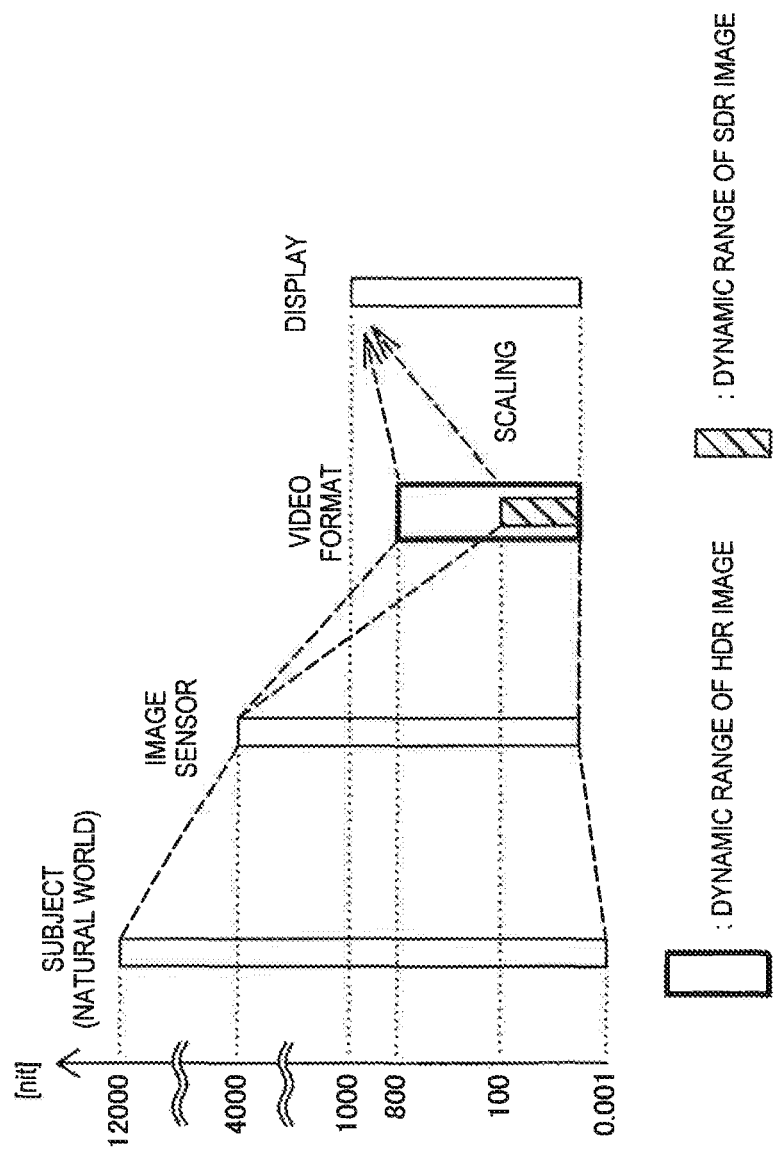
[Fig. 3]

[Fig. 4]
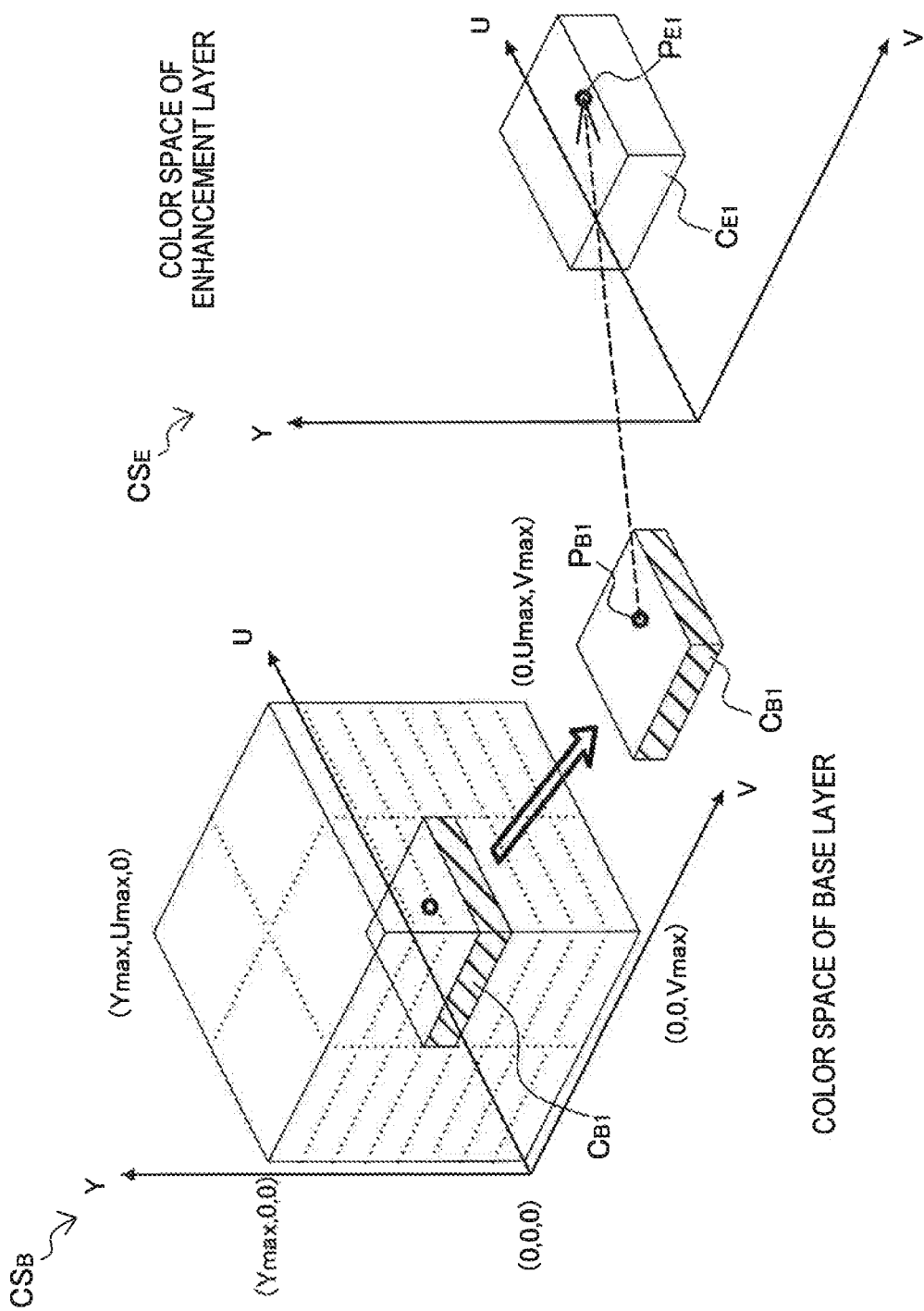

[Fig. 5]
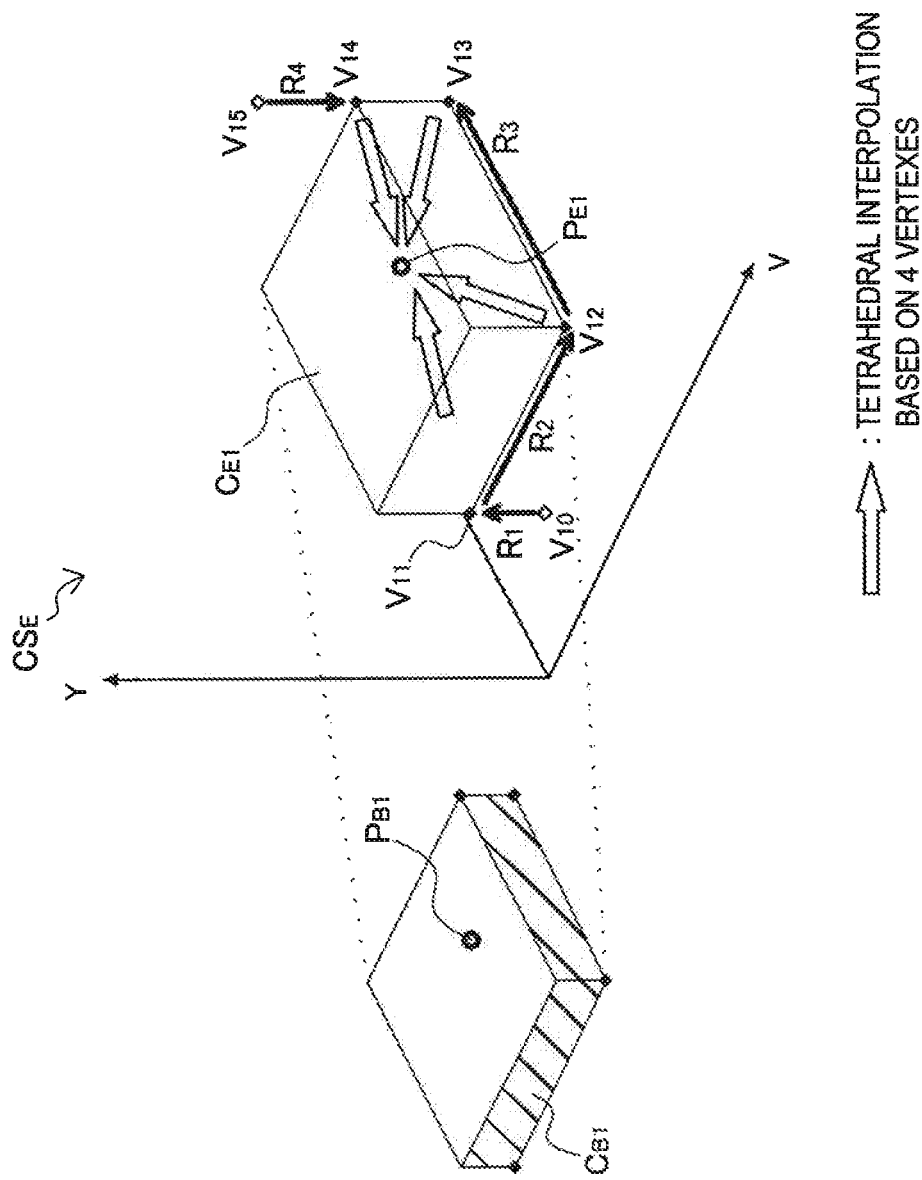

[Fig. 6]
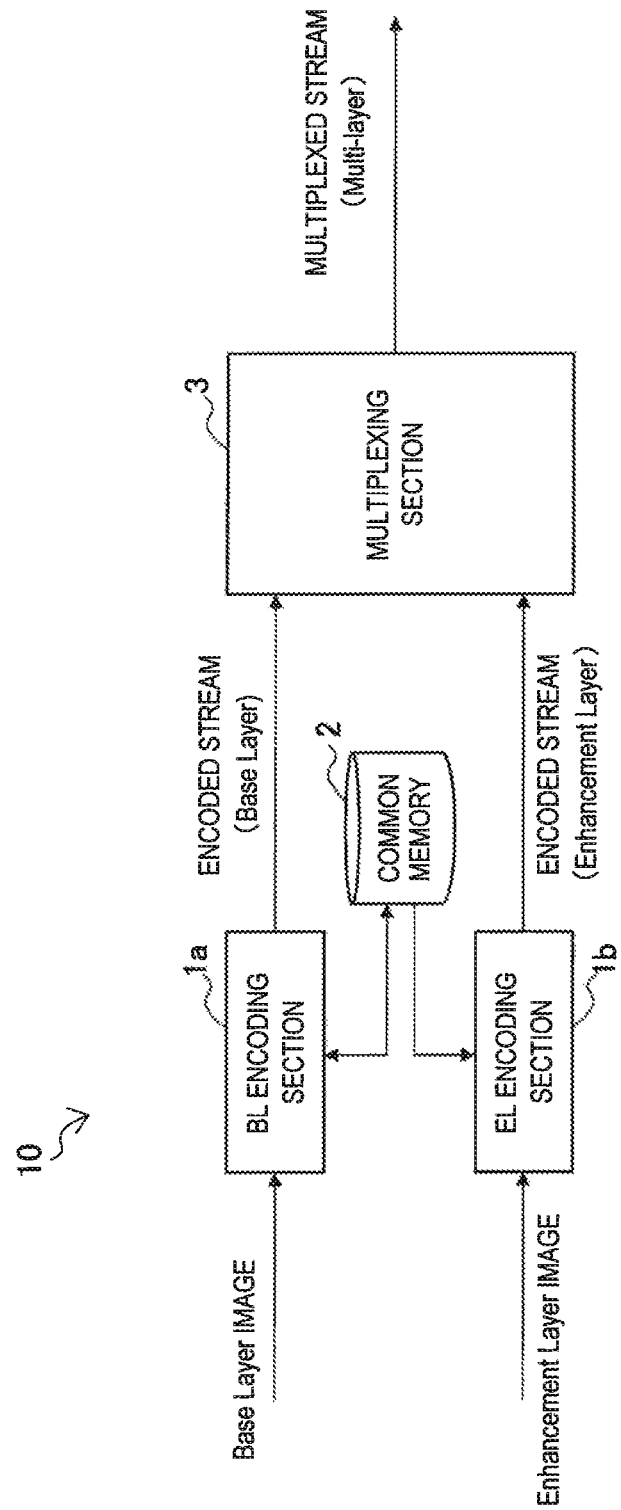

[Fig. 7]
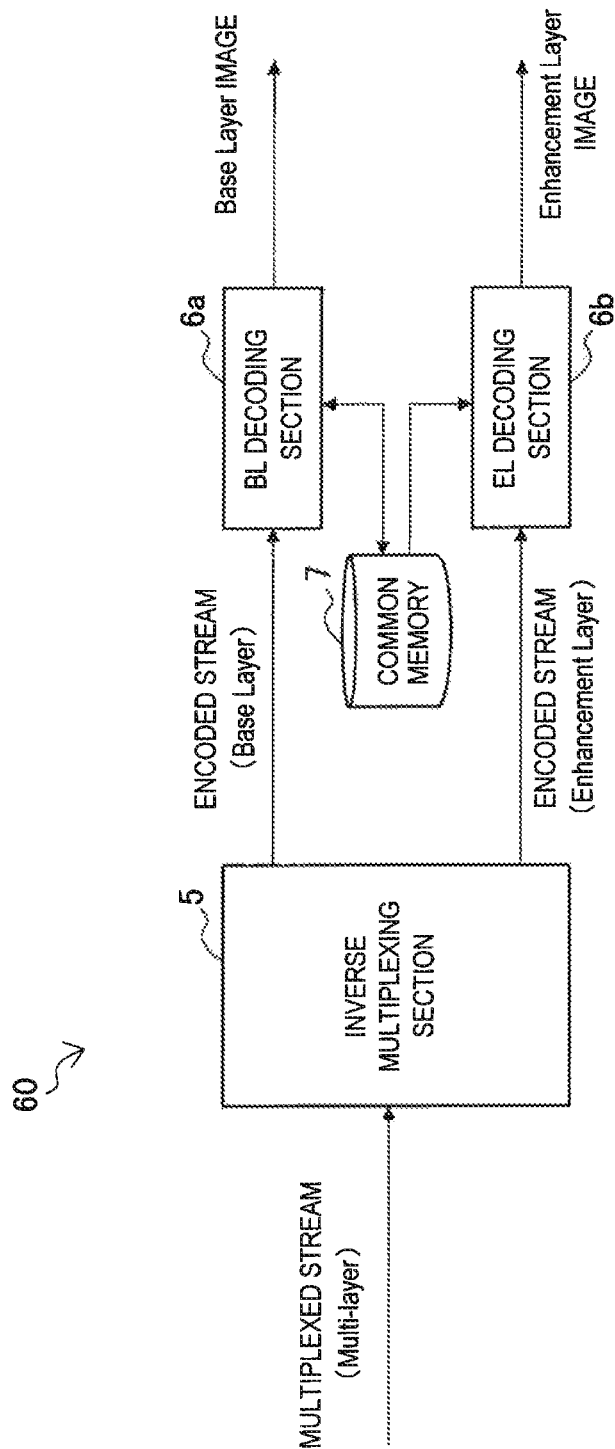

[Fig. 8]
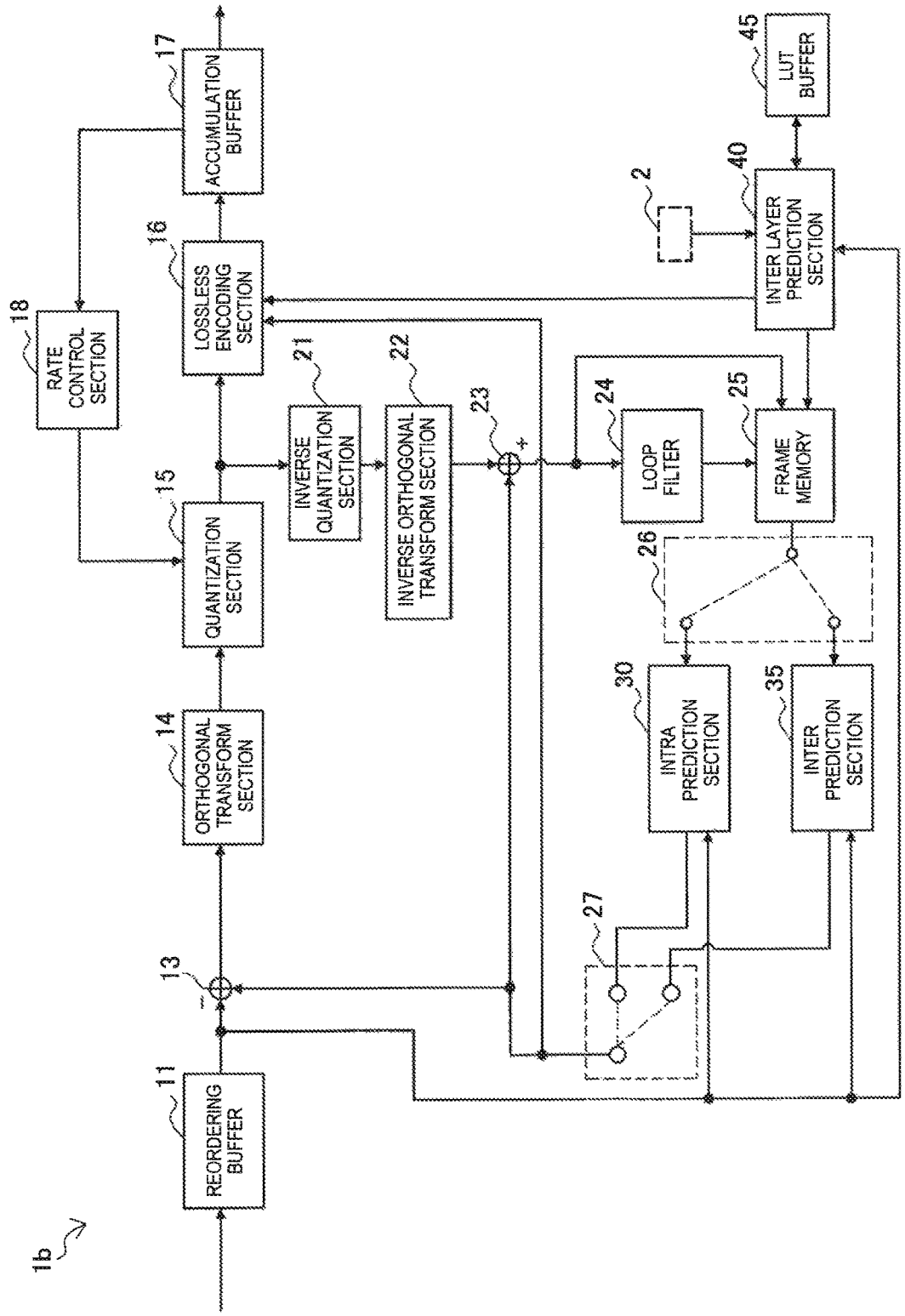

[Fig. 9]
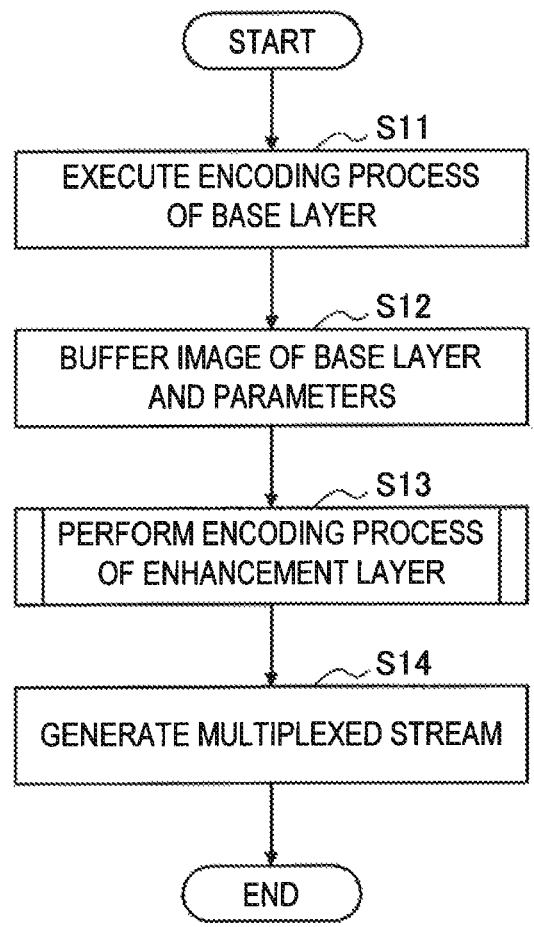

[Fig. 10]
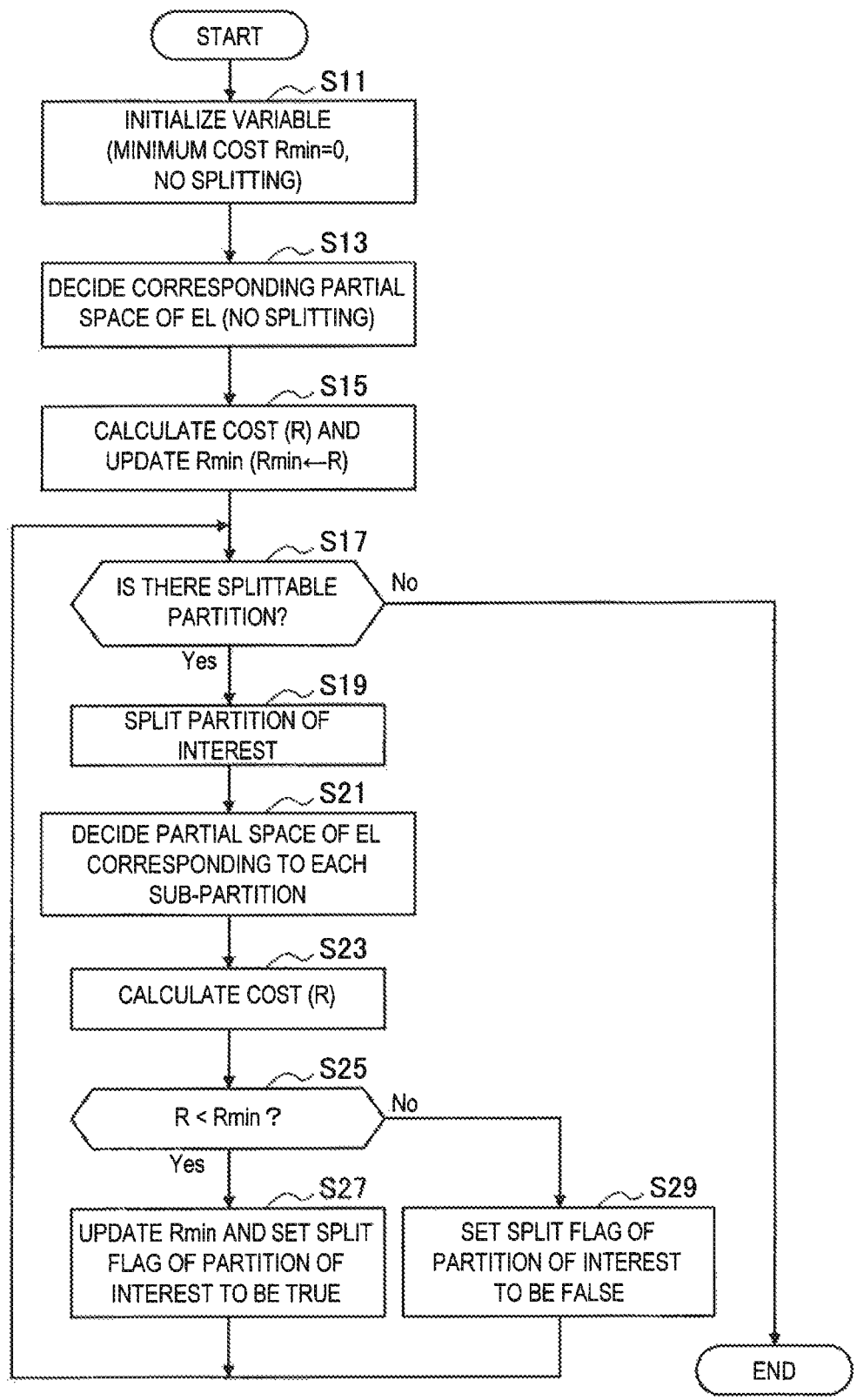

[Fig. 11]
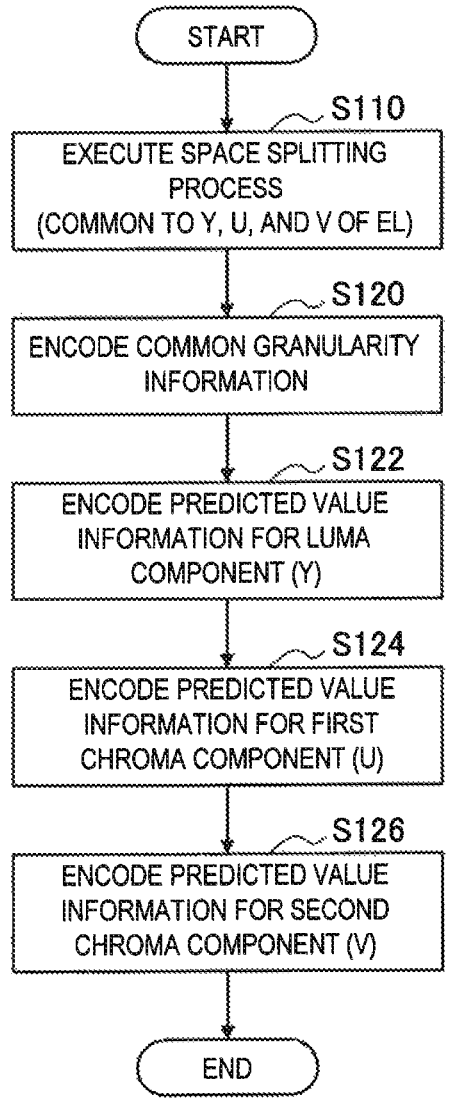

[Fig. 12]
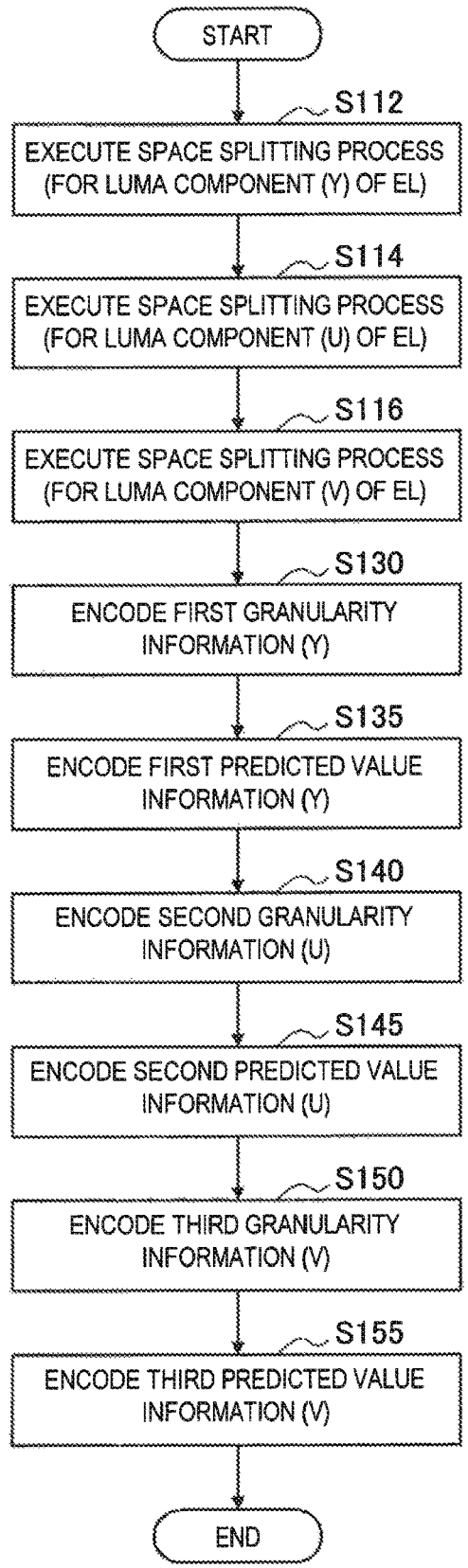

[Fig. 13]
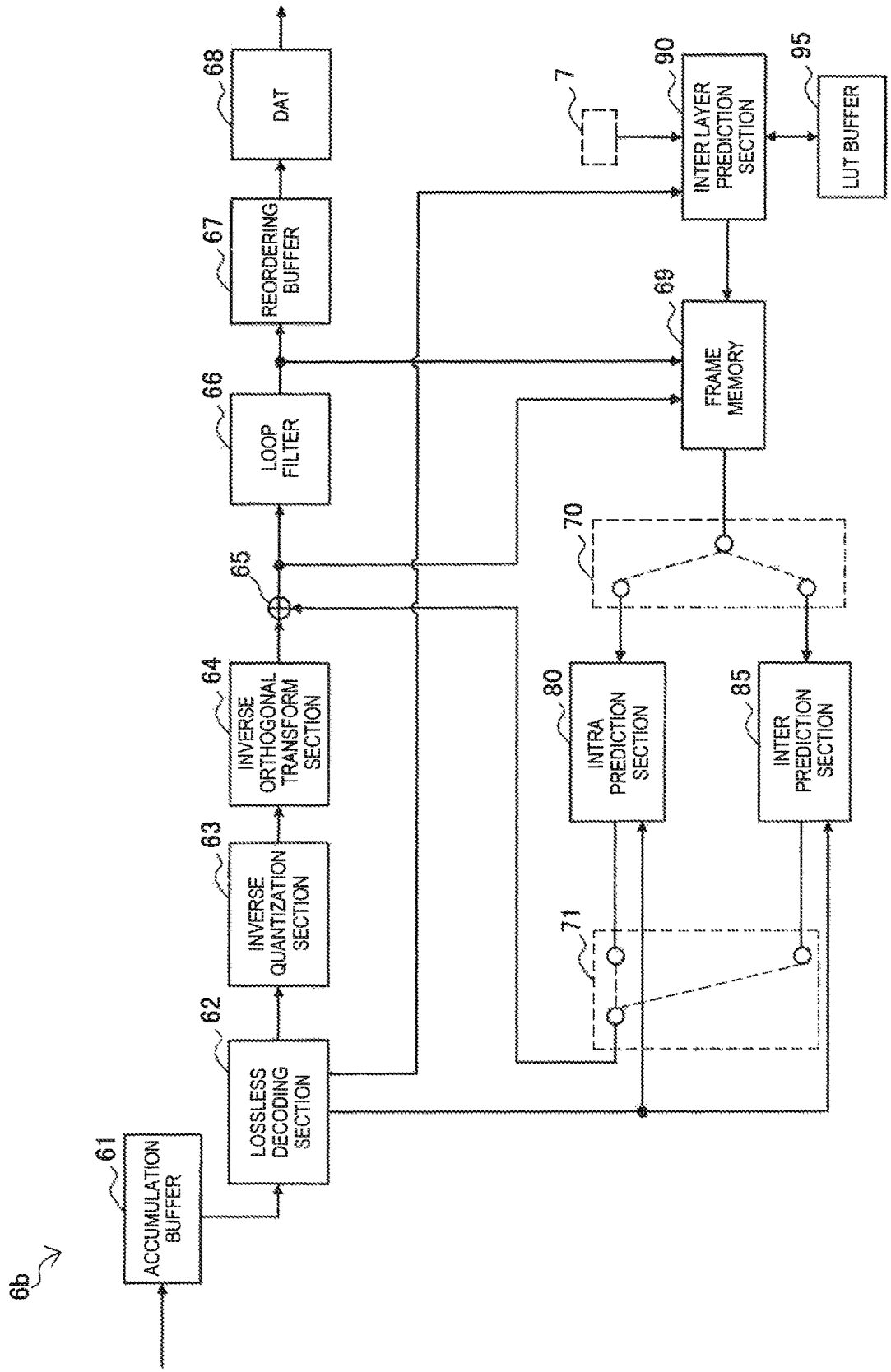

[Fig. 14]
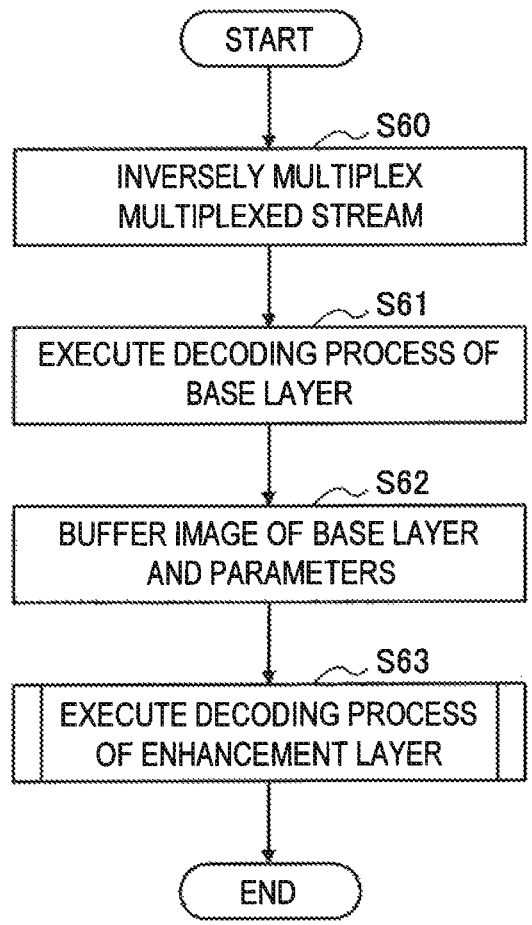

[Fig. 15]
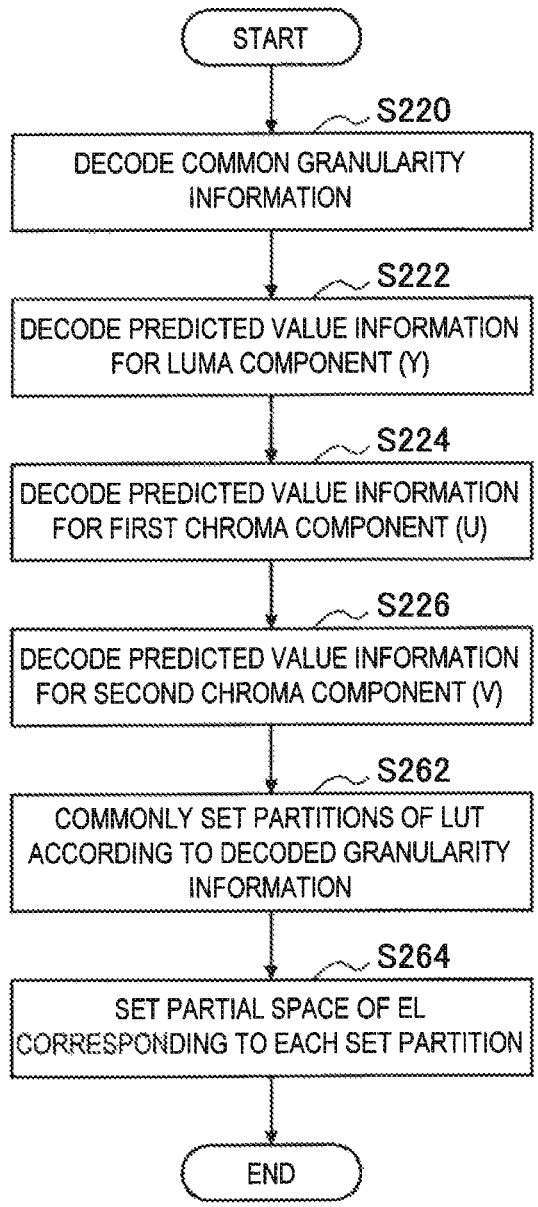

[Fig. 16]
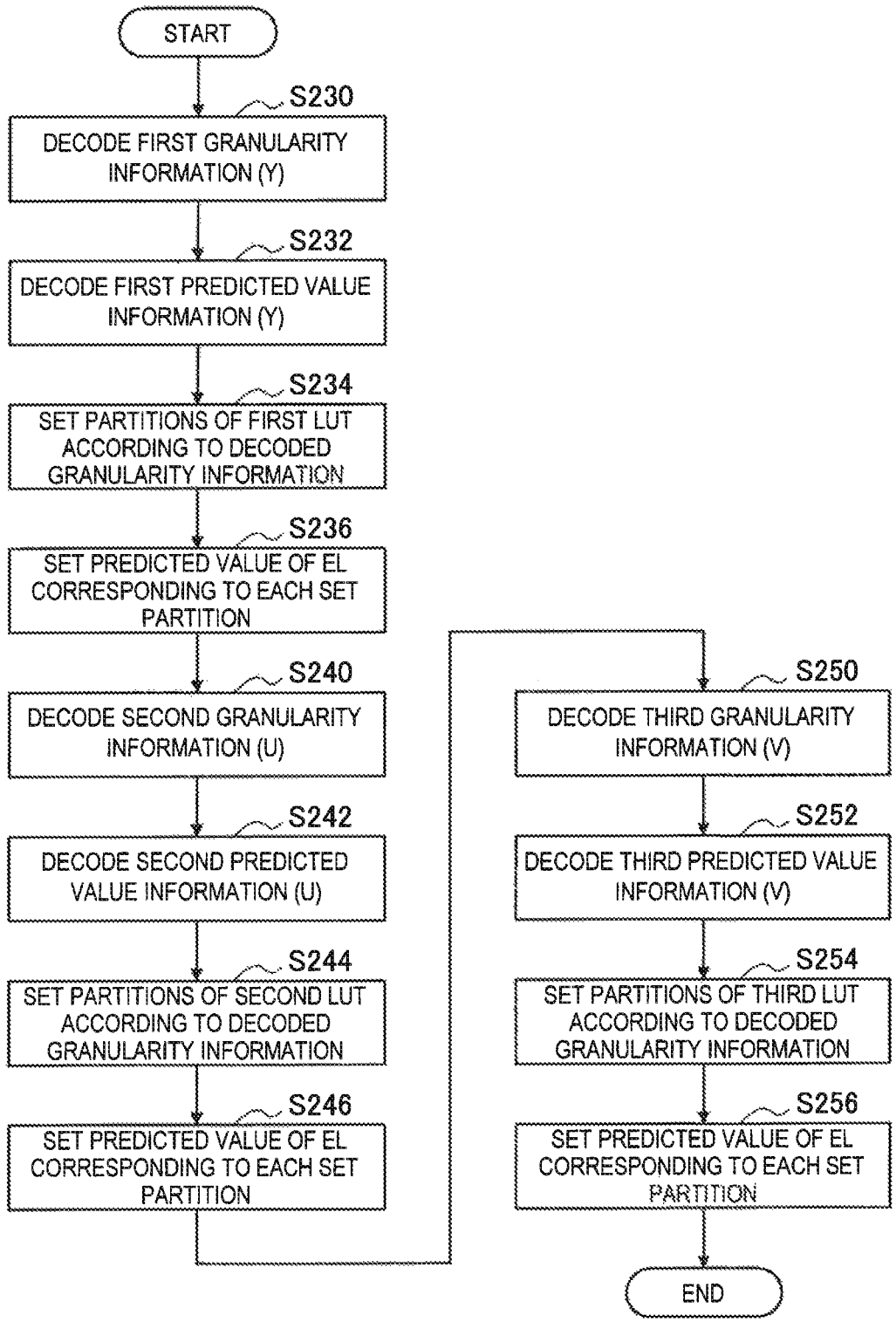

[Fig. 17]
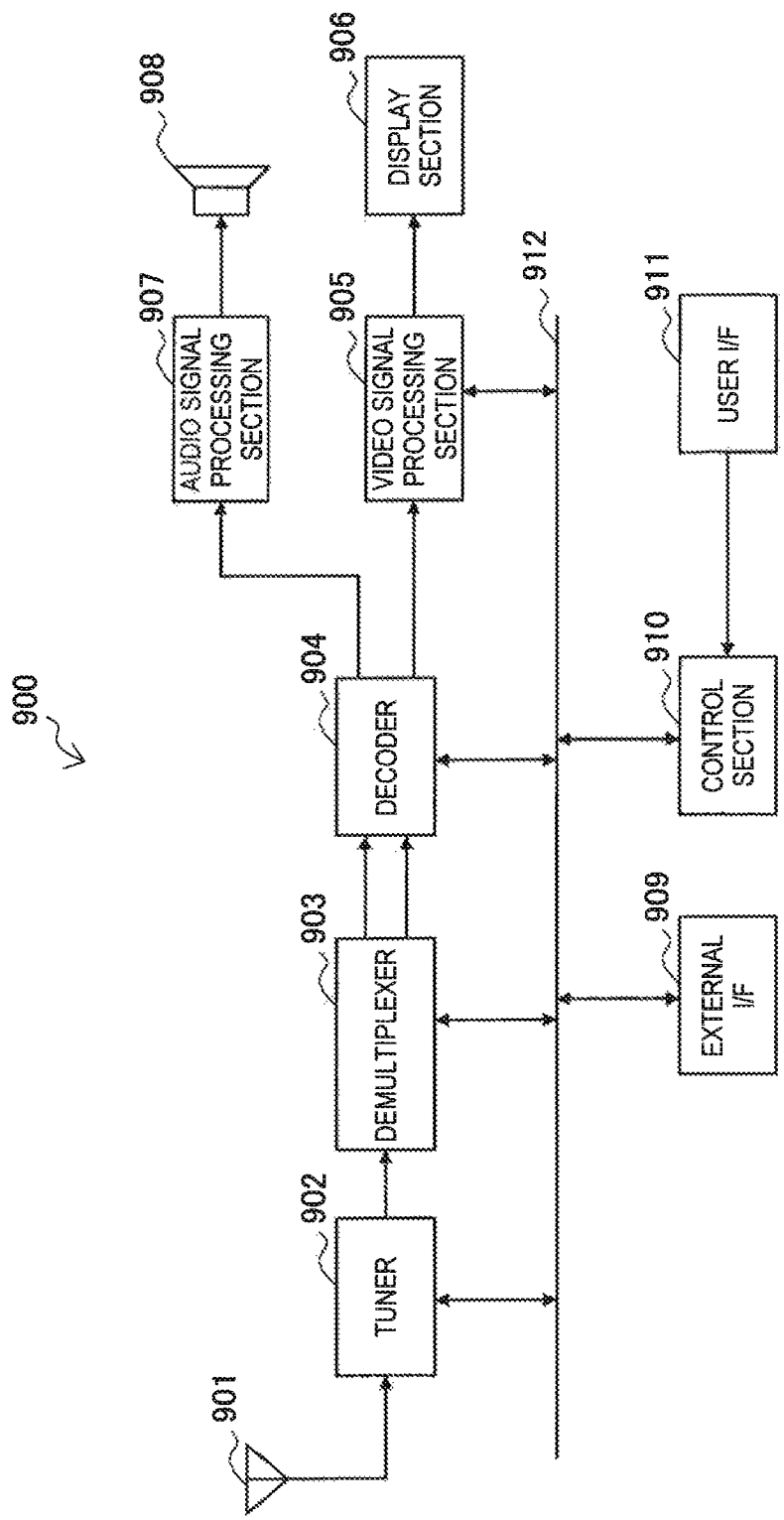

[Fig. 18]
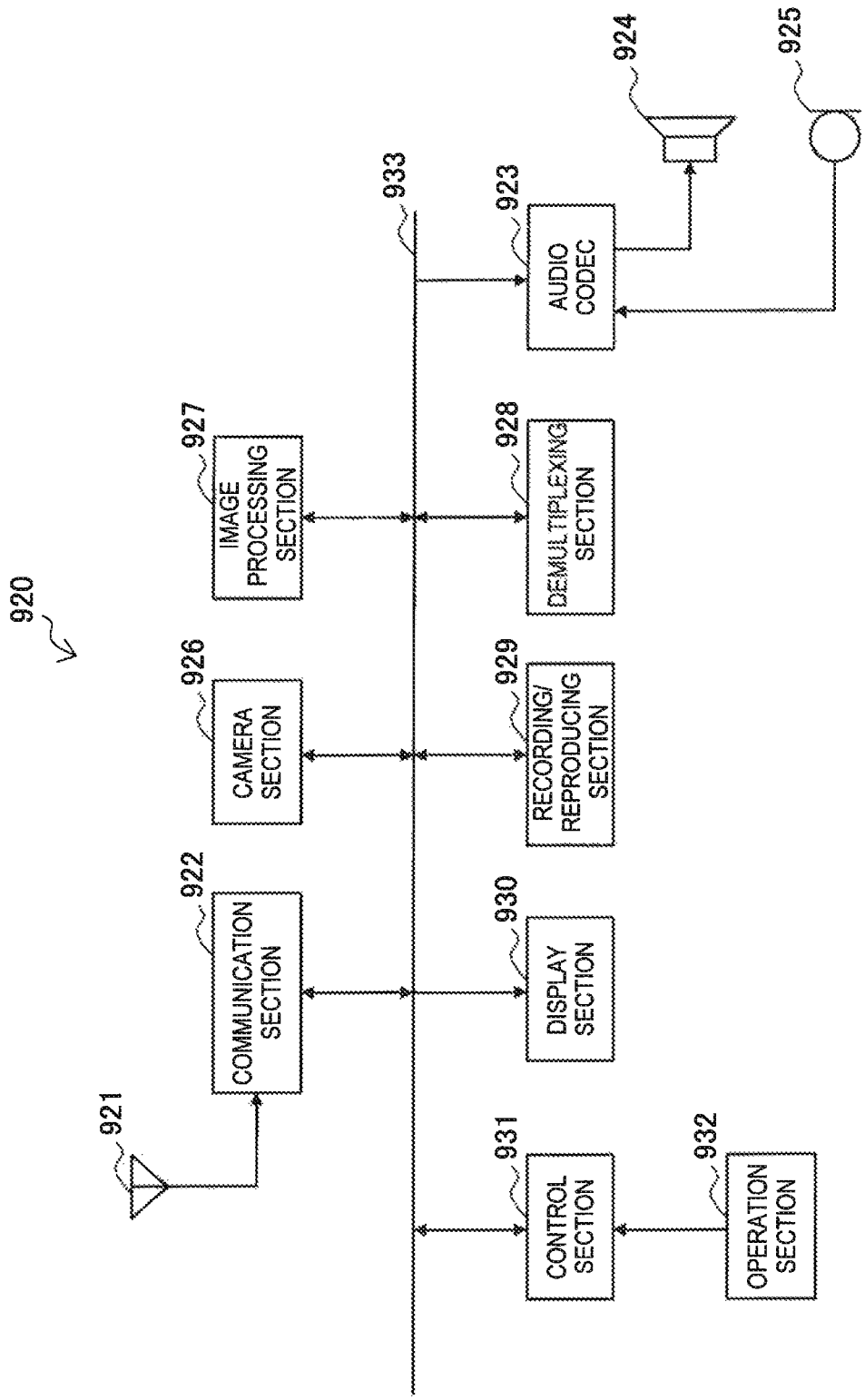

[Fig. 19]
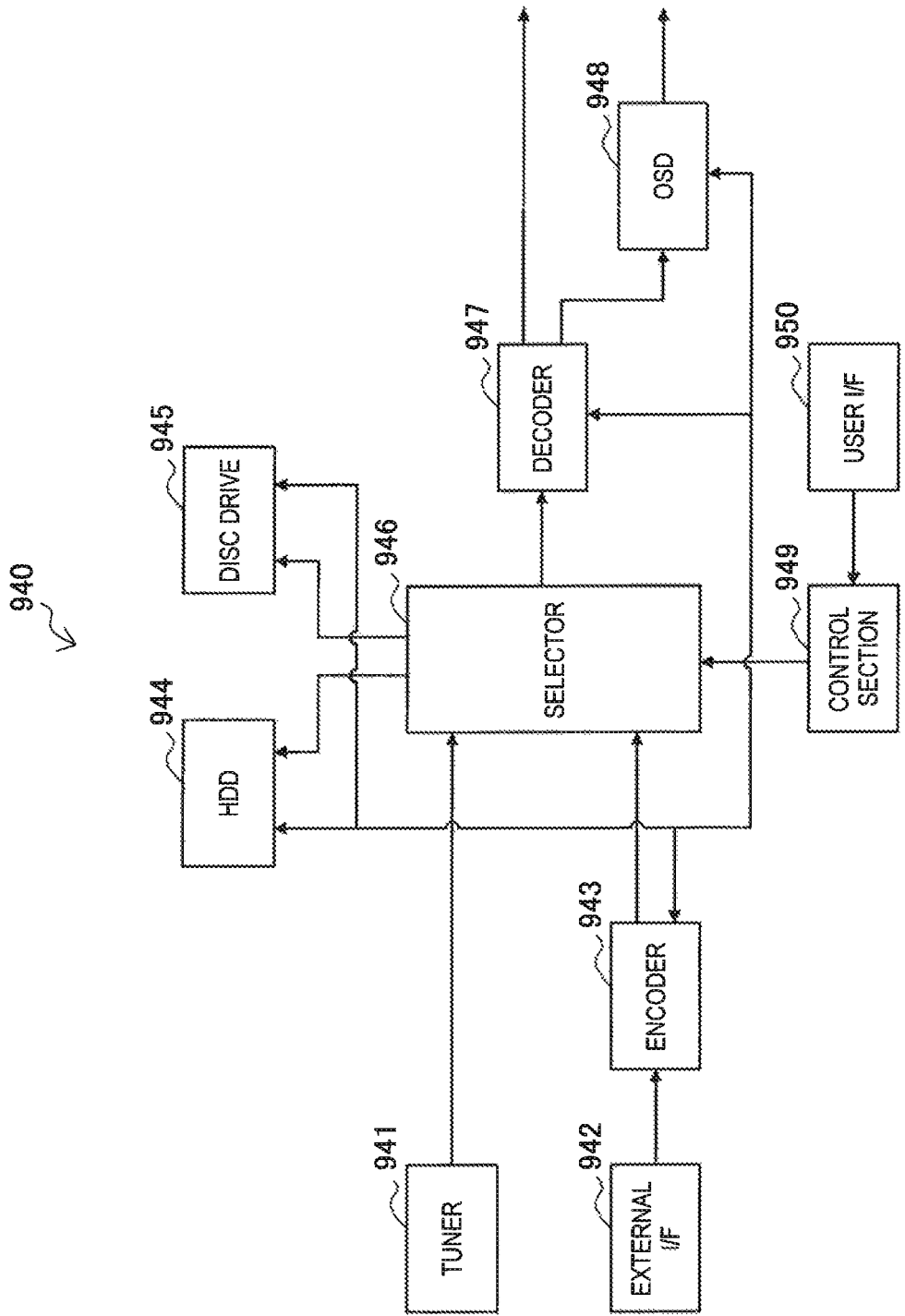

[Fig. 20]
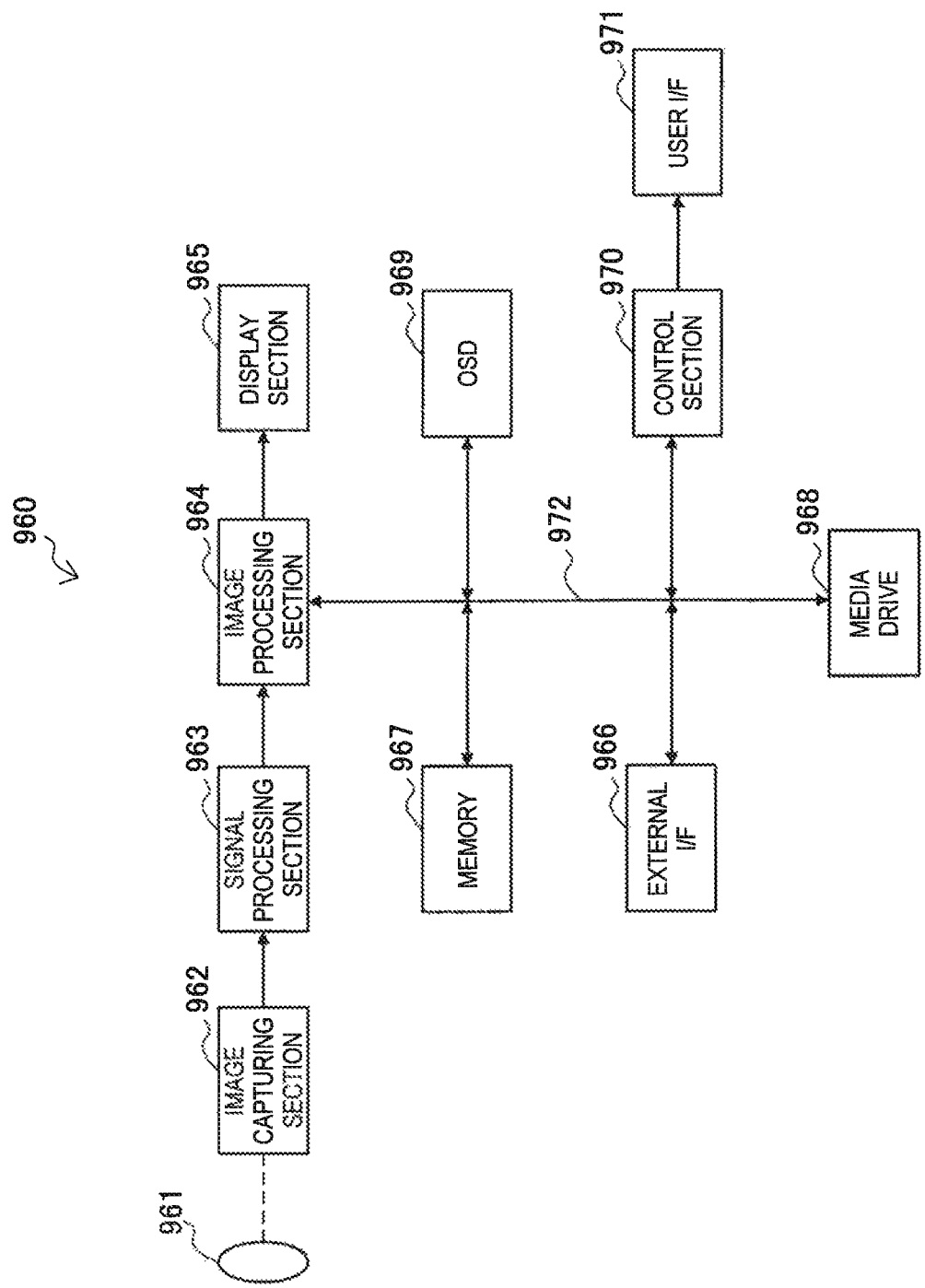

[Fig. 21]
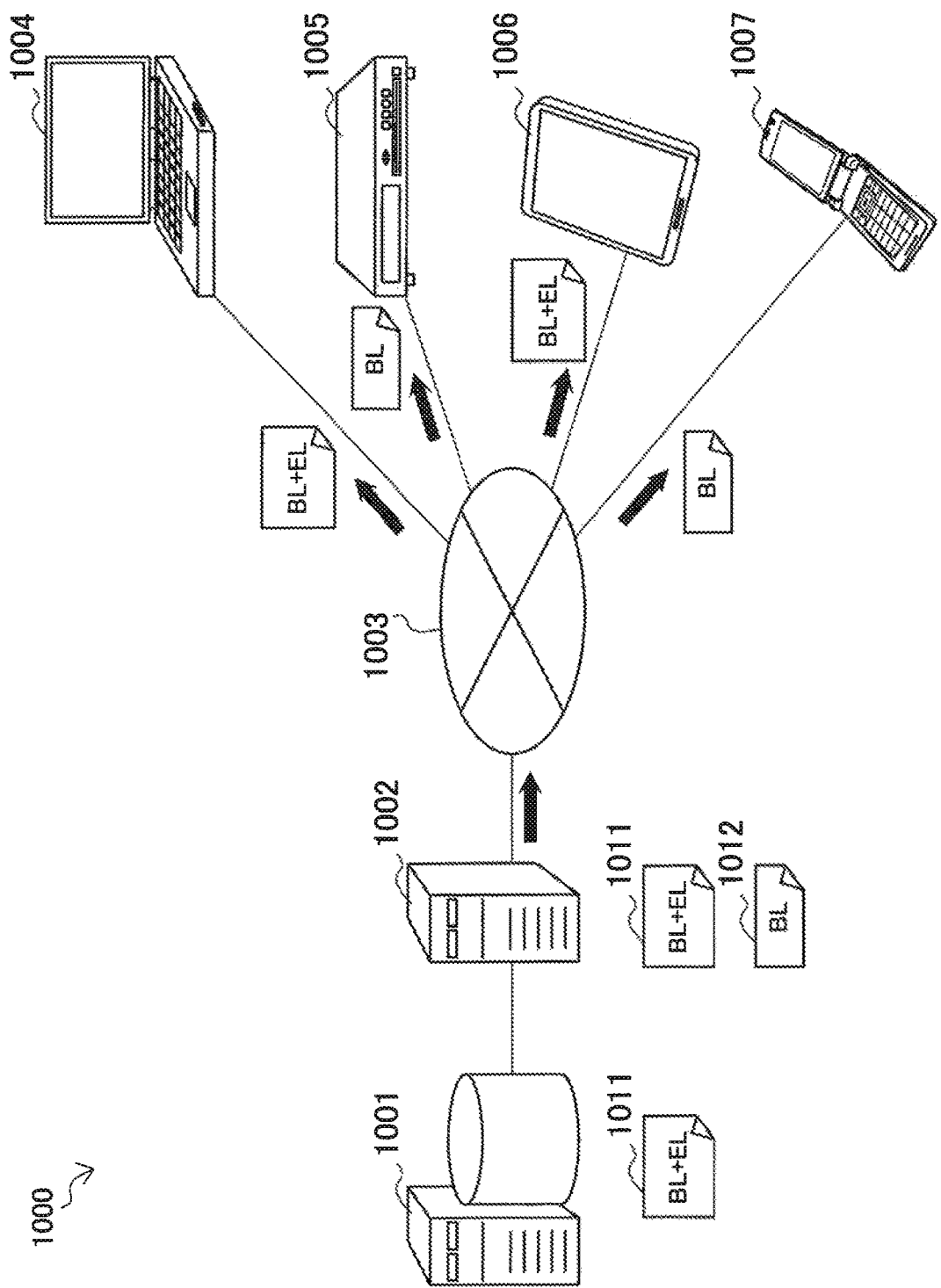

[Fig. 22]
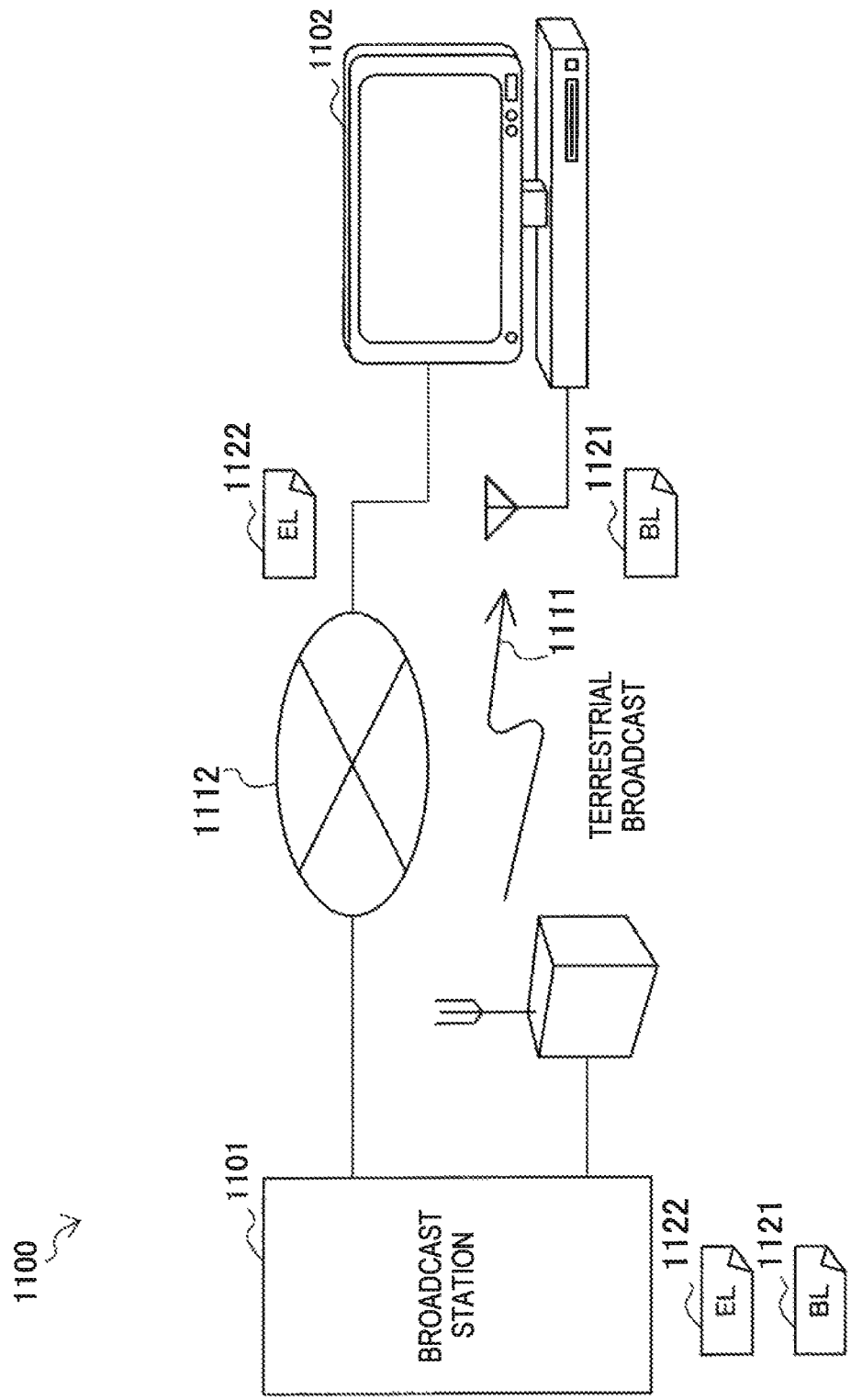

[Fig. 23]
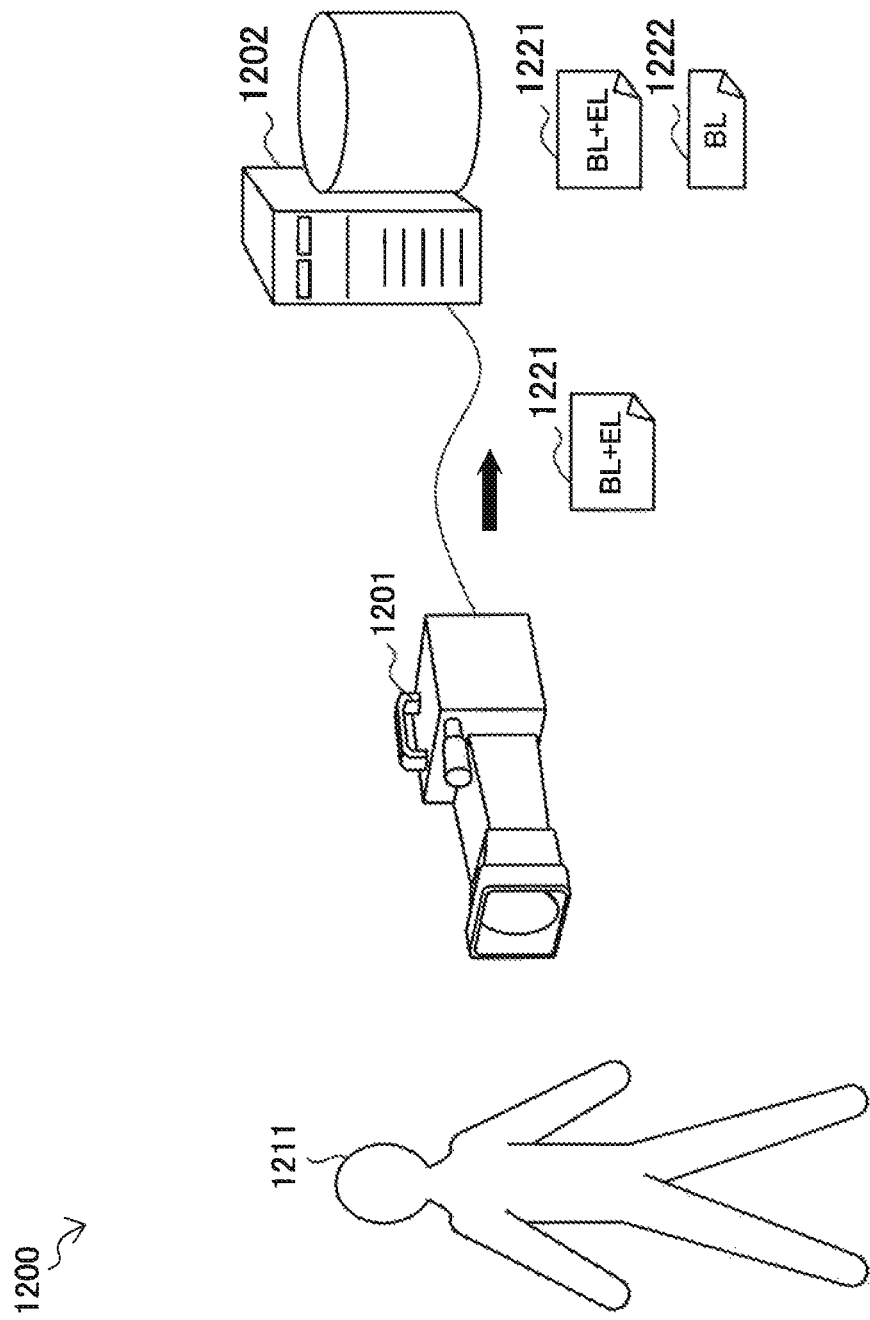

[Fig. 24]
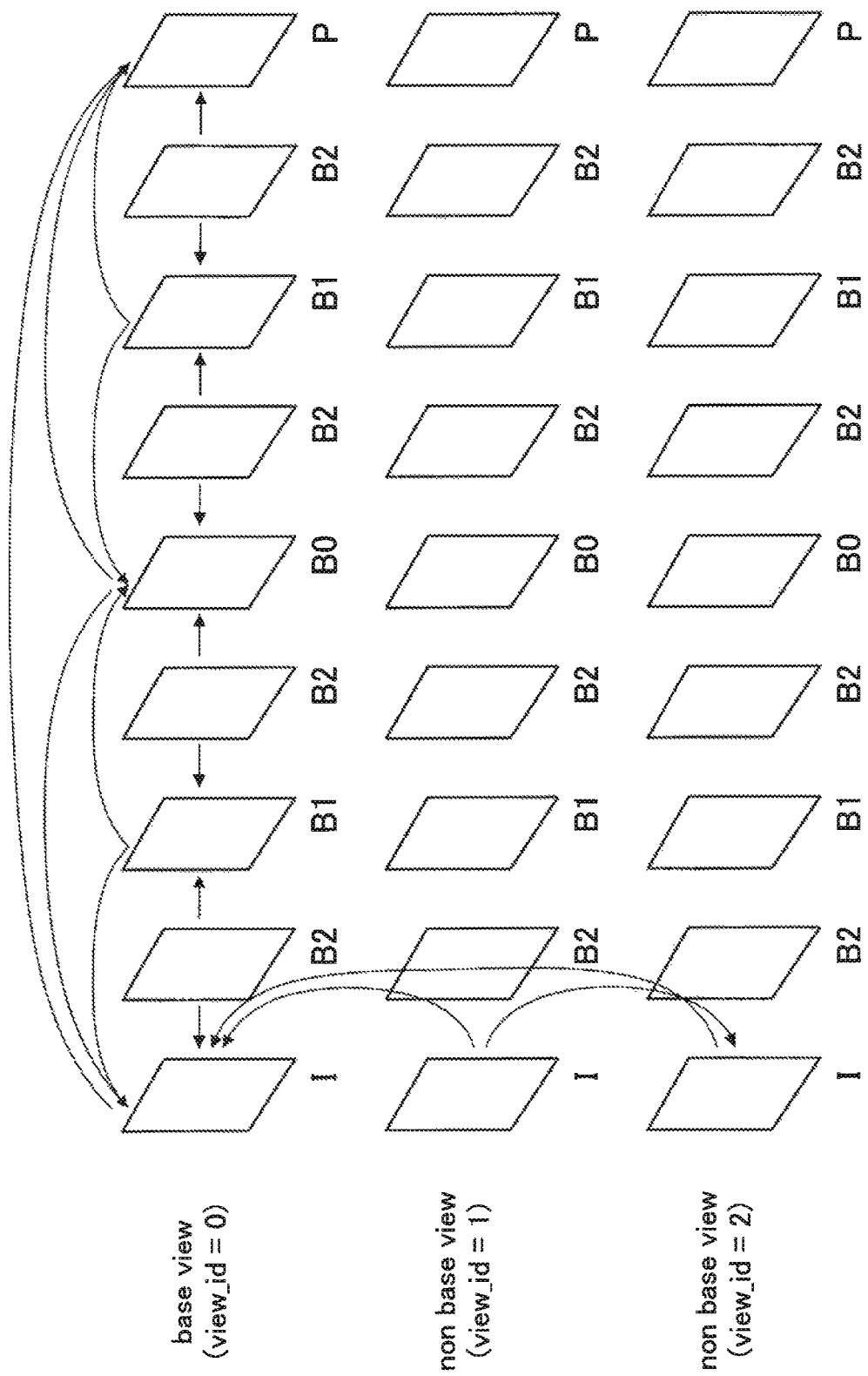

[Fig. 25]
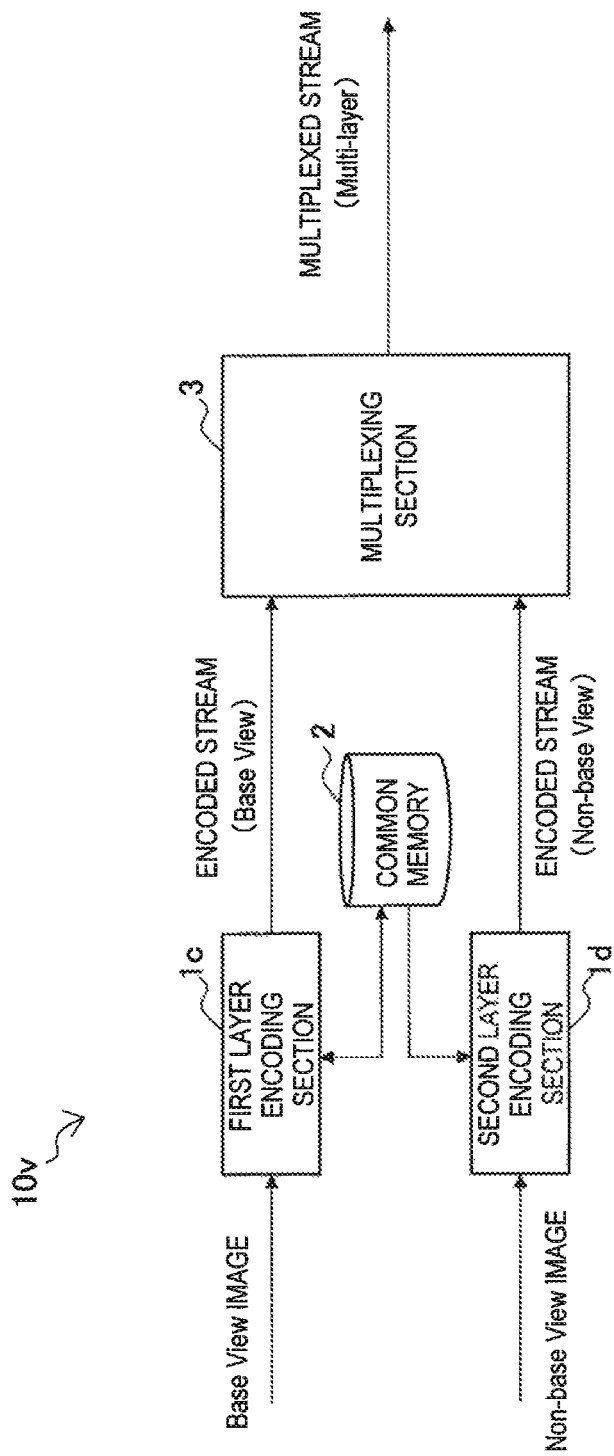

[Fig. 26]
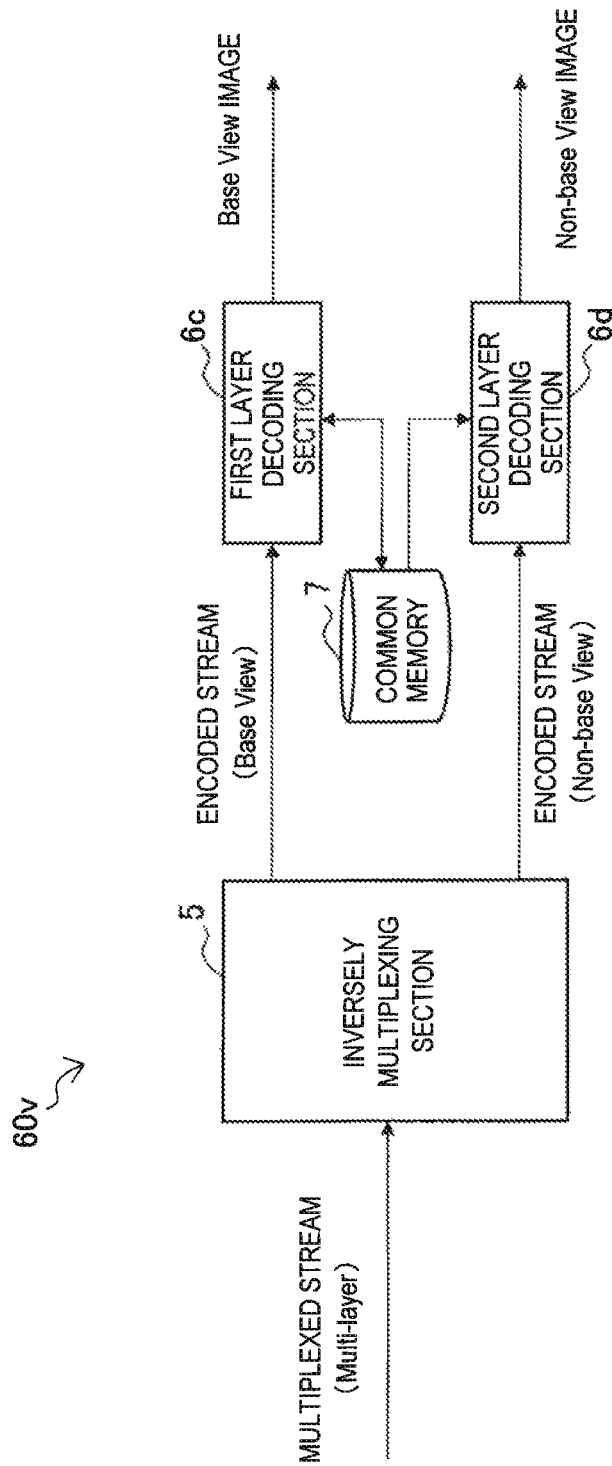

IMAGE PROCESSING DEVICE, IMAGE PROCESSING METHOD AND COMPUTER-READABLE MEDIUM

CROSS REFERENCE TO RELATED APPLICATIONS

This application is a National Stage Patent Application of PCT International Patent Application No. PCT/JP2015/002033 filed Apr. 10, 2015 under 35 U.S.C. § 371, which claims the benefit of Japanese Priority Patent Application JP 2014-125966 filed Jun. 19, 2014, the entire contents of which are all incorporated herein by reference.

TECHNICAL FIELD

The present disclosure relates to an image processing device, an image processing method and a computer-readable medium.

BACKGROUND ART

Joint Collaboration Team-Video Coding (JCTVC), which is a joint standardizing organization of ITU-T and ISO/IEC, has standardized an image encoding scheme referred to as high efficiency video coding (HEVC) for the purpose of further improving encoding efficiency than H.264/AVC (for example, see NPL 1 below). HEVC provides not only encoding of a single layer but also scalable video coding. The scalable video coding technology for HEVC is also referred to as scalable HEVC (SHVC) (for example, see NPL 2 below).

In general, the scalable video coding refers to a technology for hierarchically encoding layers that transmit rough image signals and layers that transmit fine image signals. The typical attributes hierarchized in the scalable video coding of the related art are 3 types of attributes: spatial resolution (spatial scalability), a frame rate (temporal scalability), and a signal-to-noise (SN) ratio (SNR scalability). Further, NPL 3 proposes color gamut scalability in which a color gamut, which is a kind of pixel attribute, is hierarchized. A bit depth can also be hierarchized along with the color gamut. NPL 4 proposes a technology for hierarchizing a luminance dynamic range which is also a kind of pixel attribute.

According to a scheme proposed in NPL 3, corresponding pixel vectors in the color gamut (for example, ITU-R BT.2020) of an enhancement layer are predicted from pixel vectors (Y, U, and V) in the color gamut (for example, ITU-R BT.709) of a base layer using a 3-dimensional lookup table. The lookup table is expected to be adopted in the name of a color mapping table in the standard specification of SHVC. In the color mapping table, a color space of a base layer is split into several cuboid partitions. In the color mapping table, the plurality of respective partitions formed through the splitting are mapped to corresponding partial spaces of the color space of the enhancement layer. One partial space can be specified by defining four vertexes. According to the scheme proposed in NPL 3, specific predicted pixel values are decided through tetrahedral interpolation based on the pixel values of the four vertexes.

CITATION LIST

Non Patent Literature

NPL 1: "High Efficiency Video Coding (HEVC) text specification draft 10 (for FDIS & Consent)" by Benjamin Bross, Woo-Jin Han, Gary J. Sullivan, Jens-Rainer Ohm, Gary J. Sullivan, Ye-Kui Wang, Thomas Wiegand (JCTVC-L1003_v4, 14 to 23 Jan. 2013)

NPL 2: "Preliminary version of High efficiency video coding (HEVC) scalable extension Draft 6" by Jianle Chen, Jill Boyce, Yan Ye, Miska M. Hannuksela, Gary J. Sullivan and Ye-kui Wang (JCTVC-Q1008_v2, 27 Mar. to 4 Apr. 2014)

NPL 3: "Non-SCEI: Asymmetric 3D LUT for Color Gamut Scalability" by Xiang Li, Jianle Chen and Marta Karczewicz (JCTVC-P0063_r1, 9 to 17 Jan. 2014) NPL 4: "High Dynamic Range Video Distribution Using Existing Video Codecs" by David Touze, et. al (30th Picture Coding Symposium, 8 to 11 Dec. 2013)

SUMMARY

Technical Problem

As the granularity of space splitting by the color mapping table is finer, the number of partitions of the color space of a base layer further increases and an encoding amount necessary to define a plurality of partial spaces of the corresponding enhancement layers also increases. Conversely, when the granularity of the space splitting is rougher, an encoding amount necessary for the color mapping table further decreases, but prediction accuracy of inter layer prediction may deteriorate. However, in schemes of the related art, only granularity of uniform (that is, single) splitting could be defined for three color components. For this reason, when the color space of a base layer is split with optimum granularity to predict a certain color component, the granularity becomes too rough in prediction of other color components. Thus, sufficient prediction accuracy may not be obtained or granularity unnecessarily becomes too fine.

It is desirable to provide a scheme of handling the granularity of splitting of a color space more flexibly in a scalable video coding technology of a lookup table scheme.

Solution to Problem

According to an embodiment of the present disclosure, there is provided an image processing device including circuitry configured to predict, from an image of a first layer, an image of a second layer having a different pixel attribute from the first layer, by using a lookup table in which a combination of a luma component, a first chroma component, and a second chroma component of the first layer is mapped to a predicted pixel value of the second layer corresponding to the combination, wherein a predicted value of a luma component of the second layer is acquired by using a first lookup table, and a predicted value of a first chroma component of the second layer is acquired by using a second lookup table with granularity different from granularity of the first lookup table.

According to another embodiment of the present disclosure, there is provided an image processing method that is performed by an image processing device which predicts, from an image of a first layer, an image of a second layer having a different pixel attribute from the first layer, the image processing method including: acquiring a predicted value of a luma component of the second layer by using a first lookup table in which a combination of a luma component, a first chroma component, and a second chroma component of the first layer is mapped to a predicted pixel value of the second layer corresponding to the combination;

and acquiring a predicted value of a first chroma component of the second layer by using a second lookup table with granularity different from granularity of the first lookup table.

According to another embodiment of the present disclosure, there is provided a non-transitory computer-readable medium having embodied thereon a program, which when executed by a computer causes the computer to execute an image processing method of predicting, from an image of a first layer, an image of a second layer having a different pixel attribute from the first layer, the image processing method including: acquiring a predicted value of a luma component of the second layer by using a first lookup table in which a combination of a luma component, a first chroma component, and a second chroma component of the first layer is mapped to a predicted pixel value of the second layer corresponding to the combination; and acquiring a predicted value of a first chroma component of the second layer by using a second lookup table with granularity different from granularity of the first lookup table.

Advantageous Effects of Invention

According to the technology of the present disclosure, it is possible to handle the granularity of splitting of a color space more flexibly in a scalable video coding technology of a lookup table scheme.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram for describing scalable video coding.

FIG. 2 is an explanatory diagram for describing color gamuts expressed by BT.709 and BT.2020.

FIG. 3 is an explanatory diagram for describing a luminance dynamic range.

FIG. 4 is a first explanatory diagram for describing an overview of a color mapping table of the related art.

FIGS. 5A and 5B are second explanatory diagrams for describing an overview of a color mapping table.

FIG. 6 is a block diagram illustrating a schematic configuration of an image encoding device according to an embodiment.

FIG. 7 is a block diagram illustrating a schematic configuration of an image decoding device according to an embodiment.

FIG. 8 is a block diagram illustrating an example of a configuration of an EL encoding section illustrated in FIG. 6.

FIG. 9 is a flowchart illustrating an example of a schematic flow of an encoding process according to an embodiment.

FIG. 10 is a flowchart illustrating an example of a flow of a spatial splitting process at the time of encoding.

FIG. 11 is a flowchart illustrating an example of a flow of a table information encoding process according to a scheme of the related art.

FIG. 12 is a flowchart illustrating an example of a flow of a table information encoding process according to a novel scheme.

FIG. 13 is a block diagram illustrating an example of a configuration of an EL decoding section illustrated in FIG. 7.

FIG. 14 is a flowchart illustrating an example of a schematic flow of a decoding process according to an embodiment.

FIG. 15 is a flowchart illustrating an example of a flow of a table reconstruction process according to a scheme of the related art.

FIG. 16 is a flowchart illustrating an example of a flow of a table reconstruction process according to a novel scheme.

FIG. 17 is a block diagram illustrating an example of a schematic configuration of a television device.

FIG. 18 is a block diagram illustrating an example of a schematic configuration of a mobile phone.

FIG. 19 is a block diagram illustrating an example of a schematic configuration of a recording/reproduction device.

FIG. 20 is a block diagram illustrating an example of a schematic configuration of an image capturing device.

FIG. 21 is an explanatory diagram for describing a first example of use of scalable video coding.

FIG. 22 is an explanatory diagram for describing a second example of use of scalable video coding.

FIG. 23 is an explanatory diagram for describing a third example of use of scalable video coding.

FIG. 24 is an explanatory diagram for describing a multi-view codec.

FIG. 25 is a block diagram illustrating a schematic configuration of an image encoding device for the multi-view codec.

FIG. 26 is a block diagram illustrating a schematic configuration of an image decoding device for the multi-view codec.

DESCRIPTION OF EMBODIMENTS

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview
  1-1. Scalable Video Coding
  1-2. Inter Layer Prediction in Lookup Table Scheme
  1-3. Basic Configuration Example of Encoder
  1-4. Basic Configuration Example of Decoder
2. Configuration Example of EL Encoding Section According to Embodiment
  2-1. Description of Each Unit
  2-2. Syntax Example
3. Flow of Encoding Process according to Embodiment
  3-1. Schematic Flow
  3-2. Spatial Splitting Process
  3-3. Table Information Encoding Process
4. Configuration Example of EL Decoding Section According to Embodiment
5. Flow of Decoding Process According to Embodiment
  5-1. Schematic Flow
  5-2. Table Reconstruction Process
6. Applications
  6-1. Application to Various Products
  6-2. Various Purposes of Scalable Video Coding
  6-3. Others
7. Conclusion

1. Overview

1-1. Scalable Video Coding

A plurality of layers each including a series of images are encoded in the scalable video coding. Base layers are the first to be encoded, and represent the roughest images. Encoded stream of base layers may be independently decoded without decoding of encoded streams of the other layers. The layers other than base layers are referred to as enhancement layers representing finer images. Encoded streams of enhancement layers are encoded using information included in encoded streams of base layers. Thus, to reproduce an image of an enhancement layer, encoded streams of both base layer and enhancement layer are decoded. Any number of layers greater than or equal to two layers may be handled in the scalable video coding. When three layers or more are encoded, the lowest layer is a base layer and the remaining layers are enhancement layers. Encoded streams of upper enhancement layers may be encoded and decoded using information included in encoded streams of the lower enhancement layers or an encoded stream of the base layer.

FIG. 1 illustrates three layers L1, L2, and L3 that are subjected to the scalable video coding. The layer L1 is a base layer, while the layers L2 and L3 are enhancement layers. The ratio of spatial resolution of the layer L2 to that of the layer L1 stands at 2:1. The ratio of spatial resolution of the layer L3 to that of the layer L1 stands at 4:1. These resolution ratios are merely examples. Non-integer resolution ratios such as 1.5:1 may also be used. A block B1 of the layer L1 is a processing unit for an encoding process in a picture of the base layer. A block B2 of the layer L2 is a processing unit for an encoding process in a picture of the enhancement layer showing a scene common to the block B1. The block B2 corresponds to the block B1 of the layer L1. A block B3 of the layer L3 is a processing unit for an encoding process in a picture of the upper enhancement layer showing a scene common to the blocks B1 and B2. The block B3 corresponds to the block B1 of the layer L1 and the block B2 of the layer L2.

In the layer structure exemplified in FIG. 1, the textures of the images are similar between the layers showing the common scene. That is, the textures of the block B1 in the layer L1, the block B2 in the layer L2, and the block B3 in the layer L3 are similar. Accordingly, for example, when the pixels of the block B2 or the block B3 are predicted using the block B1 as a reference block or the pixels of the block B3 are predicted using the block B2 as a reference block, there is a probability of high prediction accuracy being obtained. Such prediction between the layers is referred to as inter layer prediction. There are a plurality of specific prediction schemes classified as the inter layer prediction. As one example, there is intra BL prediction of predicting a decoded image of an enhancement layer from a decoded image (reconstructed image) of a base layer. As another example, there are intra residual prediction and inter residual prediction of predicting a predicted error image of an enhancement layer from a predicted error (residual) image of a base layer.

1-2. Inter Layer Prediction in Lookup Table Scheme

(1) Color Gamut Scalability

In the spatial scalability exemplified in FIG. 1, predicted pixels of the inter layer prediction are formed by interpolating pixels through upsampling. On the other hand, the inter layer prediction in the lookup table scheme proposed in NPL 3 is a scheme suitable for scalable video coding when pixel attributes are hierarchized as in color gamut scalability. When the pixel attributes are hierarchized, there is a probability of pixel values being different between layers despite the fact that the pixels are pixels at the same spatial and temporal positions.

As one example, an image of the layer L which is a base layer is assumed to be an HD television image and an image of the layer L2 which is an enhancement layer is assumed to be a UHD television image. FIG. 2 is an explanatory diagram for describing color gamuts expressed by BT.709 and BT.2020. Referring to FIG. 2, a color gamut graph in which a 3-dimensional color space is mapped into a 2-dimensional plane using a predetermined constraint condition is illustrated. A cross mark on the graph represents a position to which white is mapped. A dashed line on the graph represents a range of colors expressed by the BT.709. A solid line on the graph represents a range of colors expressed by the BT.2020. A dotted line on the graph represents a range of colors perceived by human sight. As understood from FIG. 2, the BT.2020 can express more diverse colors than the BT.709. In the inter layer prediction from the layer L1 to the layer L2, the predicted pixel values of the layer L2 mapped to the pixels of the layer L1 can be acquired based on a 3-dimensional lookup table. The upsampling may be executed on input pixel values input to the lookup table or on the predicted pixel values acquired based on the lookup table. The pixel values of an enhancement layer are restored by adding residual (predicted error) which can be separately encoded and decoded to the predicted pixel values.

(2) Dynamic Range Scalability

The lookup table scheme is not limited to the color gamut scalability, but can also be applied to other kinds of scalable video coding. For example, optimum mapping of pixel values before and after conversion based on the lookup table can be defined to convert a pixel attribute such as a dynamic range or a bit depth.

The luminance dynamic range is an important attribute that has an influence on image quality. The maximum luminance of a standard dynamic range (SDR) image supported by many displays of the related art is 100 nits. On the other hand, the maximum luminance of a high dynamic range (HDR) image supported by high-end displays recently available in the markets reaches, for example, 800 nits. An SDR image is also referred to as a low dynamic range (LDR) image in contrast with an HDR image.

FIG. 3 is an explanatory diagram for describing a dynamic range of a video format. The vertical axis of FIG. 3 represents luminance (in nits). The maximum luminance of the natural world reaches 20000 nits in some cases. The luminance of a general subject is, for example, a maximum of about 12000 nits. On the other hand, the upper limit of the dynamic range of an image sensor is less than the maximum luminance of the natural world and can be, for example, 4000 nits. An image signal generated by an image sensor is recorded in another predetermined video format. The dynamic range of an SDR image is indicated by a bar shaded by diagonal lines in the drawing and the upper limit of the dynamic range is 100 nits. Accordingly, when a captured image is recorded as an SDR image, the dynamic range of luminance is considerably compressed, for example, according to a scheme such as knee compression. When the maximum luminance which can be expressed by a display is 1000 nits, scaling by a factor of 10 is executed at the time of display of an SDR image. However, the image quality of a display image that has undergone such scaling may easily deteriorate consequently. The dynamic range of an HDR image is indicated by a bar of a thick frame in the drawing and the upper limit of the dynamic range is 800 nits. Accordingly, even when a captured image is recorded as an HDR image, the dynamic range of luminance is also compressed, for example, according to a scheme such as knee compression. When the maximum luminance which can be expressed by a display is 1000 nits, scaling by a factor of 1.25 is executed at the time of display of an HDR image. Since the scaling ratio is small, the image quality of a display image deteriorates less.

Accordingly, supporting of an HDR image as a video format results in a benefit of providing a high-quality image to a user. Further, dynamic range scalability is beneficially realized because of guarantee of compatibility with a device supporting an SDR image, storage restriction, correspondence to various transmission bands, and the like. The document, "High Dynamic Range Video Distribution Using Existing Video Codecs" (David Touze, et. al, 30th Picture Coding Symposium, 8 to 11 Dec. 2013) proposes a technology to be said to be a form of the dynamic range scalability. However, in the technology proposed in this document, a complicated algorithm for filtering of a filter tap configured by pixel values extending across a plurality of frames, gamma correction in an RGB region, or the like is necessary in order to restore an HDR image without adopting a lookup table scheme.

(3) Color Mapping Table

In a latest specification of SHVC, a color mapping table is a lookup table in which combinations of a luma component (Y), a first chroma component (U), and a second chroma component (V) of a base layer are mapped to predicted pixel values of an enhancement layer corresponding to the combinations. In the color mapping table, one predicted pixel vector is not simply mapped to each of a plurality of cuboid partitions formed by splitting the color space of the base layer, but each of the cuboid partitions is mapped to a partial space of the color space of the corresponding enhancement layer.

FIGS. 4 and 5 are explanatory diagrams for describing an overview of a color mapping table of the related art. On the left in FIG. 4, a color space $CS_B$ of a base layer having three component axes Y, U, and V is illustrated. In the color space $CS_B$, the maximum value of the luma component (Y) is $Y_{max}$, the maximum value of the first chroma component (U) is $U_{max}$, and the maximum value of the second chroma component (V) is $V_{max}$. In practice, the range of the first chroma component can be $-U_{max}/2$ to $U_{max}/2$ and the range of the second chroma component can be $-V_{max}/2$ to $V_{max}/2$ (herein, the color space is offset for brevity of the description). According to the latest specification, a syntax allows the three color component axes to be split up to depth 3 (that is, up to $2^3=8$ partitions), but the upper limit value of the depth of the splitting of the first and second chroma components is set to be 1 (that is, up to $2^1=2$ partitions) because of conformance restriction. Accordingly, as exemplified in FIG. 4, the color space $CS_B$ can be split into the maximum of 8×2×2 (=32) cuboid partitions. A partition $C_{B1}$ in the drawing is one of the partitions and an input pixel $P_{B1}$ belongs to the partition $C_{B1}$.

On the right in FIG. 4, a color space $CS_B$ of an enhancement layer having three component axes Y, U, and V is illustrated. A partial space $C_{E1}$ occupies a portion corresponding to a cuboid partition $C_{B1}$ in the color space $CS_E$ of the enhancement layer. The color mapping table specifies a partial space of the enhancement layer corresponding to each cuboid partition of the base layer by defining four vertexes. For example, a pixel value of a predicted pixel $P_{E1}$ corresponding to an input pixel $P_{B1}$ belonging to the cuboid partition $C_{B1}$ is decided through triangular pyramid interpolation based on pixel values of the four vertexes of the partial space $C_{E1}$.

FIG. 5 illustrates four vertexes $V_{11}$, $V_{12}$, $V_{13}$, and $V_{14}$ of the partial space $C_{E1}$ corresponding to the cuboid partition $C_{B1}$ as an example. To specify the positions of these vertexes, four parameters $R_1$, $R_2$, $R_3$, and $R_4$ can typically be encoded. For example, the parameter $R_1$ specifies the offset of the vertex $V_{11}$ from a certain specific criterion position $V_{10}$ (for example, the position of the vertex of an adjacent partition) in the Y axis direction. The parameter $R_2$ specifies the offset of the vertex $V_{12}$ from the vertex $V_{11}$ in the V axis direction. The parameter $R_3$ specifies the offset of the vertex $V_{13}$ from the vertex $V_{12}$ in the U axis direction. The parameter $R_4$ specifies the offset of the vertex $V_{14}$ from a certain specific criterion position $V_{15}$ in the Y axis direction.

Table 1 to Table 3 show syntaxes associated with the color mapping table and described in NPL 2. As shown in Table 1, when a flag colour_mapping_enabled_flag validating the color mapping table is set to be true in a picture parameter set (PPS), a function colour_mapping_table( ) defining the color mapping table is called.

TABLE 1

Syntax (Part) of PPS Associated with Color Mapping Table
(From Jcwc-Q1008_v2)

```
pic_parameter_set_rbsp( ) {
    :
    pps_extension_flag
    if( pps_extension_flag ) {
        for ( i=0; i < 8; i++ )
            pps_extension_type_flag[i]
        if( pps_extension_type_flag[0] ) {
            poc_reset_info_present_flag
            colour_mapping_enabled_flag
            if( colour_mapping_enabled_flag )
                colour_mapping_table( )
        }
        :
    }
```

A parameter cm_octant_depth and a parameter cm_y_part_num_log 2 of the function colour_mapping_table( ) shown in Table 2 are parameters associated with the upper limit value of the depth of the partition of the three color components and the depth of an additional partition of a luma component, respectively. Parameters cm_input_luma_bit_depth_minus8 and cm_input_chroma_bit_depth_delta are parameters associated with a bit depth of an input pixel value of the color mapping table. Parameters cm_output_luma_bit_depth_minus8 and cm_output_chroma_bit_depth_delta are parameters associated with a bit depth of an output pixel value of the color mapping table. A parameter cm_res_quant_bits is a parameter associated with quantization of the output pixel value. A function colour_mapping_octants( ) is a recursive function and the details of this function are shown in Table 3.

TABLE 2

Syntax of Color Mapping Table
(From JCTVC-Q1008_v2)

```
colour_mapping_table( ) {
    cm_octant_depth
    cm_y_part_num_log2
    cm_input_luma_bit_depth_minus8
    cm_input_chroma_bit_depth_delta
    cm_output_luma_bit_depth_minus8
    cm_output_chroma_bit_depth_delta
    cm_res_quant_bits
    colour_mapping_octants(0,0,0,0,1<<cm_octant_depth )
}
```

A function colour_mapping_octants( ) shown in Table 3 is formed by a first half (2nd to 10th lines) and a second half (11th to 21st lines). The first half mainly includes granularity information (3rd line) defining the granularity of the color mapping table and a recursive call (8th and 9th lines) of the function. Here, the granularity information includes a split flag split_octant_flag set that defines the splitting of the color space of the base layer. When a certain cuboid partition is further split, the split flag indicates "true." When the split flag is shown to be true, the function colour_mapping_octants( ) is called recursively for each of eight sub-partitions (octants) formed by further splitting the cuboid partition. When a certain cuboid partition is not further split, the split flag indicates "false." When the split flag indicates "false," predicted value information corresponding to the partition is encoded in the second half of the syntax. Here, the predicted value information specifies a partial space of the color space of the enhancement layer by parameters res_y, res_u, and res_v along with repetition of variable vertexes corresponding to four vertexes of the partial space.

TABLE 3

Syntax of Recursive Portion of Color Mapping Table
(From JCTVC-Q1008_v2)

```
colour_mapping_octants( depth, yIdx, uIdx, vIdx, length ) {
    if ( depth < cm_octant_depth )
        split_octant_flag
    if ( split_octant_flag ) {
        for( k=0; k < 2; k++ )
            for( m=0; m < 2 ; m++ )
                for( n=0; n < 2; n++ )
                    colour_mapping_octants( depth+1, yIdx+YPartNum *
k * length/2,
                        uIdx+m * length/2, uIdx+n * length/2, length/2)
    }
    else {
        for( i=0; i < YPartNum; i++ )
            for( vertex=0; vertex < 4; vertex++ ) {
                coded_vertex_flag[yIdx+i][uIdx][vIdx][vertex]
                if( coded_vertex_flag[yIdx+i][uIdx][vIdx][vertex] ) {
                    res_y[yIdx+i][uIdx][vIdx][vertex]
                    res_u[yIdx+i][uIdx][vIdx][vertex]
                    res_v[yIdx+i][uIdx][vIdx][vertex]
                }
            }
    }
}
```

As the granularity of the splitting of the color space of the base layer specified by the above-described granularity information is finer, the number of partitions of the color space of the base layer further increases. Since the above-described predicted value information is repeated by the number of partitions (a product of the number (=4) of vertexes and the number of partitions) of the color space of the base layer, an improvement of the prediction accuracy by the fineness of the granularity has a trade-off relation with an increase in an encoding amount necessary to define the lookup table. Here, for example, since the conversion of the luma component is not necessarily linear in the dynamic range scalability, finer space splitting is preferable. On the other hand, the conversion of the chroma components may be more simply linear conversion (that is, linear interpolation or the like based on rougher space splitting). However, the above-described syntax of the scheme of the related art can define only the granularity of uniform (that is, single) splitting to predict three color components of the enhancement layer. Consequently, the granularity of space splitting optimum for a certain color component is too rough or finer than necessary for the other color components.

Accordingly, in embodiments to be described below, a structure in which the granularity of splitting of a color space can be handled more flexibly is introduced in a scalable video coding technology of a lookup table scheme. In the embodiments, apart from a first lookup table used for inter layer prediction of a luma component, a second lookup table with granularity different from the granularity of the first lookup table is allowed to be defined in order to make inter layer prediction of at least one of chroma components.

1-3. Basic Configuration Example of Encoder

FIG. 6 is a block diagram illustrating a schematic configuration of an image encoding device 10 supporting the scalable video coding according to an embodiment. Referring to FIG. 6, the image encoding device 10 includes a base layer (BL) encoding section 1*a*, an enhancement layer (EL) encoding section 1*b*, a common memory 2, and a multiplexing section 3.

The BL encoding section 1*a* encodes a base layer image to generate an encoded stream of a base layer. The EL encoding section 1*b* encodes an enhancement layer image to generate an encoded stream of an enhancement layer. The common memory 2 stores information commonly used between the layers. The multiplexing section 3 multiplexes the encoded stream of the base layer generated by the BL encoding section 1*a* and the encoded stream of at least one enhancement layer generated by the EL encoding section 1*b* to generate a multiplexed stream of multiple layers.

1-4. Basic Configuration Example of Decoder

FIG. 7 is a block diagram illustrating a schematic configuration of an image decoding device 60 supporting the scalable video coding according to an embodiment. Referring to FIG. 7, the image decoding device 60 includes an inverse multiplexing section 5, a base layer (BL) decoding section 6*a*, an enhancement layer (EL) decoding section 6*b*, and a common memory 7.

The inverse multiplexing section 5 inversely multiplexes the multiplexed stream of the multiple layers into the encoded stream of the base layer and the encoded stream of at least one enhancement layer. The BL decoding section 6*a* decodes the base layer image from the encoded stream of the base layer. The EL decoding section 6*b* decodes the enhancement layer image from the encoded stream of the enhancement layer. The common memory 7 stores information commonly used between the layers.

In the image encoding device 10 exemplified in FIG. 6, the configuration of the BL encoding section 1*a* for the encoding of the base layer is similar to the configuration of the EL encoding section 1*b* for the encoding of the enhancement layer. Several parameters and images generated or acquired by the BL encoding section 1a can be buffered using the common memory 2 to be reused by the EL encoding section 1b. In the next section, the configuration of the EL encoding section 1b will be described in detail.

Likewise, in the image decoding device 60 exemplified in FIG. 7, the configuration of the BL decoding section 6a for the decoding of the base layer is similar to the configuration of the EL decoding section 6b for the decoding of the enhancement layer. Several parameters and images generated or acquired by the BL decoding section 6a can be buffered using the common memory 7 to be reused by the EL decoding section 6b. Further, in the next section, the configuration of the EL decoding section 6b will be described in detail.

2. Configuration Example of El Encoding Section According to Embodiment

2-1. Description of Each Unit

FIG. 8 is a block diagram illustrating an example of a configuration of the EL encoding section 1b illustrated in FIG. 6. Referring to FIG. 8, the EL encoding section 1b includes a reordering buffer 11, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a loop filter 24, a frame memory 25, selectors 26 and 27, an intra prediction section 30, an inter prediction section 35, an inter layer prediction section 40, and an LUT buffer 45.

The reordering buffer 11 reorders images included in a series of image data. The reordering buffer 11 reorders the images according to a group-of-pictures (GOP) structure associated with an encoding process, and then outputs image data after reordering to the subtraction section 13, the intra prediction section 30, the inter prediction section 35, and the inter layer prediction section 40.

The subtraction section 13 is supplied with the image data input from the reordering buffer 11 and predicted image data input from the intra prediction section 30 or the inter prediction section 35 to be described below. The subtraction section 13 calculates predicted error data which is a difference between the image data input from the reordering buffer 11 and the predicted image data and outputs the calculated predicted error data to the orthogonal transform section 14.

The orthogonal transform section 14 executes an orthogonal transform on the predicted error data input from the subtraction section 13. The orthogonal transform executed by the orthogonal transform section 14 may be, for example, a discrete cosine transform (DCT) or a Karhunen-Loeve transform. In HEVC, the orthogonal transform is executed for each block referred to as a transform unit (TU). The TU is a block formed by splitting a coding unit (CU). The orthogonal transform section 14 outputs transform coefficient data acquired through an orthogonal transform process to the quantization section 15.

The quantization section 15 is supplied with the transform coefficient data input from the orthogonal transform section 14 and a rate control signal from the rate control section 18 to be described below. The quantization section 15 quantizes the transform coefficient data in a quantization step decided according to the rate control signal. The quantization section 15 outputs the transform coefficient data (hereinafter referred to as quantized data) after the quantization to the lossless encoding section 16 and the inverse quantization section 21.

The lossless encoding section 16 executes a lossless encoding process on the quantized data input from the quantization section 15 to generate an encoded stream of an enhancement layer. The lossless encoding section 16 encodes various parameters referred to at the time of decoding of the encoded stream and inserts the encoded parameters into a header region of the encoded stream. The parameters encoded by the lossless encoding section 16 include information regarding intra prediction to be described below, information regarding inter prediction, and information regarding inter layer prediction. The lossless encoding section 16 then outputs the generated encoded stream to the accumulation buffer 17.

The accumulation buffer 17 uses a storage medium such as a semiconductor memory to temporarily store the encoded stream input from the lossless encoding section 16. The accumulation buffer 17 then outputs the accumulated encoded stream to a transmission section that is not illustrated (e.g. a communication interface or connection interface for a peripheral device, etc.), at the rate according to the bandwidth of a transmission channel.

The rate control section 18 monitors the free space of the accumulation buffer 17. The rate control section 18 generates a rate control signal in accordance with the free space of the accumulation buffer 17, and then outputs the generated rate control signal to the quantization section 15. For example, when the accumulation buffer 17 has little free space, the rate control section 18 generates a rate control signal for lowering the bit rate of the quantized data. For example, when the accumulation buffer 17 has sufficient free space, the rate control section 18 generates a rate control signal for increasing the bit rate of the quantized data.

The inverse quantization section 21, the inverse orthogonal transform section 22, and the addition section 23 form a local decoder. The inverse quantization section 21 inversely quantizes the quantized data of the enhancement layer in the same quantization step as that used by the quantization section 15 to restore the transform coefficient data. The inverse quantization section 21 then outputs the restored transform coefficient data to the inverse orthogonal transform section 22.

The inverse orthogonal transform section 22 executes an inverse orthogonal transform process on the transform coefficient data input from the inverse quantization section 21 to restore the predicted error data. As in the orthogonal transform, the inverse orthogonal transform is executed for each TU. The inverse orthogonal transform section 22 then outputs the restored predicted error data to the addition section 23.

The addition section 23 adds the restored predicted error data input from the inverse orthogonal transform section 22 to the predicted image data input from the intra prediction section 30 or the inter prediction section 35 to generate the decoded image data (reconstructed image of the enhancement layer). The addition section 23 then outputs the generated decoded image data to the loop filter 24 and the frame memory 25.

The loop filter 24 includes a filter group configured to improve image quality. A deblocking filter (DF) is a filter that reduces block distortion occurring at the time of encoding an image. A sample adaptation offset (SAO) filter is a filter that adds an adaptively decided offset value to each pixel value. The loop filter 24 filters the decoded image data input from the addition section 23 and outputs decoded image data after the filtering to the frame memory 25.

The frame memory 25 uses a storage medium to store the decoded image data of the enhancement layer input from the addition section 23, the decoded image data of the enhancement layer after the filtering input from the loop filter 24, and reference image data of the base layer input from the inter layer prediction section 40.

The selector 26 reads the decoded image data before the filtering used for the intra prediction from the frame memory 25 and supplies the read decoded image data as reference image data to the intra prediction section 30. Further, the selector 26 reads the decoded image data after the filtering used for the inter prediction from the frame memory 25 and supplies the read decoded image data as reference image data to the inter prediction section 35. When an image based on the inter layer prediction is used in the intra prediction section 30 or the inter prediction section 35, the selector 26 supplies the reference image data generated by the inter layer prediction section 40 to the intra prediction section 30 or the inter prediction section 35.

The selector 27 outputs, to the subtraction section 13, the predicted image data that is a result of intra prediction output from the intra prediction section 30, and outputs information on intra prediction to the lossless encoding section 16 in the intra prediction mode. The selector 27 also outputs, to the subtraction section 13, the predicted image data that is a result of inter prediction output from the inter prediction section 35, and outputs information on inter prediction to the lossless encoding section 16 in the inter prediction mode. The selector 27 switches the intra prediction mode and the inter prediction mode in accordance with the magnitude of a cost function value.

The intra prediction section 30 executes an intra prediction process for each prediction unit (PU) of HEVC based on original image data and the decoded image data of the enhancement layer. For example, the intra prediction section 30 evaluates a prediction result in each candidate mode of a prediction mode set using a predetermined cost function. Next, the intra prediction section 30 selects a prediction mode in which the cost function value is the minimum, i.e., a prediction mode in which a compression rate is the highest, as an optimum prediction mode. The intra prediction section 30 generates predicted image data of the enhancement layer according to the optimum prediction mode. The intra prediction section 30 may include intra BL prediction or intra residual prediction using an image based on the inter layer prediction in the prediction mode set for the enhancement layer. The intra prediction section 30 outputs the information on the intra prediction including prediction mode information indicating the selected optimum prediction mode, the cost function value, and the predicted image data to the selector 27.

The inter prediction section 35 executes an inter prediction process for each PU of HEVC based on the original image data and the decoded image data of the enhancement layer. For example, the inter prediction section 35 evaluates a prediction result in each candidate mode of the prediction mode set using a predetermined cost function. The inter prediction section 35 selects a prediction mode in which the cost function value is the minimum, i.e., a prediction mode in which a compression rate is the highest, as an optimum prediction mode. The inter prediction section 35 generates predicted image data of the enhancement layer according to the optimum prediction mode. The inter prediction section 35 may include inter residual prediction using an image based on the inter layer prediction in the prediction mode set for the enhancement layer. The inter prediction section 35 outputs the information on the inter prediction including motion information and prediction mode information indicating the selected optimum prediction mode, the cost function value, and the predicted image data to the selector 27.

The inter layer prediction section 40 executes upsampling on the image (the decoded image or the predicted error image) of the base layer buffered by the common memory 2 according to a resolution ratio of the base layer to the enhancement layer. When the image of the enhancement layer has a different pixel attribute from the image of the base layer, the inter layer prediction section 40 converts the pixel value of each pixel of the base layer subjected to the upsampling into a predicted value pixel of the enhancement layer using a lookup table (LUT). Herein, the pixel attribute includes at least one of a color gamut, a bit depth, a dynamic range. The inter layer prediction section 40 generates lookup table information defining the lookup table to be used for the inter layer prediction. The lookup table information mainly includes the granularity information and the predicted value information. The lookup table information generated by the inter layer prediction section 40 is output to the lossless encoding section 16 to be encoded by the lossless encoding section 16.

In an embodiment, the inter layer prediction section 40 acquires a predicted value of a luma component of the enhancement layer using an LUT (LUT_Y) for the luma component (Y) and acquires a predicted value of a first chroma component of the enhancement layer using an LUT (LUT_U) for the first chroma component (U). The inter layer prediction section 40 may acquire a second chroma component of the enhancement layer using an LUT (LUT_V) for a second chroma component (V). The granularity of the space splitting of the LUT_Y, the LUT_U, and the LUT_V can be set to differ (the granularity may not necessarily differ, but may be identical consequently when an encoding cost is the minimum). The granularity of the space splitting may be set in advance depending on a kind of pixel attribute, a system requisite, a setting executed in advance by the user, or the like. One LUT may be shared for the inter layer prediction of the first chroma component and the second chroma component. A predicted image generated using two or more lookup tables by the inter layer prediction section 40 can be stored in the frame memory 25 to be used as a reference image by the intra prediction section 30 or the inter prediction section 35.

The LUT buffer 45 is a buffer that buffers two or more lookup tables (two or more lookup tables among the LUT_Y, the LUT_U, and the LUT_V) used by the inter layer prediction section 40. In each lookup table, combinations of the luma component (Y), the first chroma component (U), and the second chroma component (V) of the base layer are mapped to the predicted pixel values of the enhancement layer corresponding to the combinations.

2-2. Syntax Example

In an embodiment, the lookup table information generated by the inter layer prediction section 40 and encoded by the lossless encoding section 16 includes at least table information for the LUT_Y and table information for the LUT_U. The lookup table information may include table information for the LUT_V. The table information on each table mainly includes the granularity information including a flag set defining the splitting of the color space of the base layer and the predicted value information corresponding to each of the plurality of cuboid partitions formed through the splitting.

Table 4 to Table 6 show examples of the syntaxes of the lookup table information according to an embodiment. As shown in Table 4, in an embodiment, when a flag colour_mapping_enabled_flag validating the color mapping table is set to be true in a PPS, a function colour_mapping_table(component) defining the lookup table is called for each color component for which definition is necessary. An argument component of the function colour_mapping_table(component) is an identifier of the color component and may be, for example, any of "Y," "U," and "V." In the example of the following table, the function colour_mapping_table(component) is called three times to separately define the lookup tables for the Y component, the U component, and the V component.

TABLE 4

Example of Syntax (Part) of Modified PPS
Associated with Color Mapping Table

```
pic_parameter_set_rbsp( ) {
    :
    pps_extension_flag
    if(pps_extension_flag ) {
        for (i=0; i < 8; i++ )
            pps_extension_type_flag[i]
        if( pps_extension_type_flag[0] ) {
            poc_reset_info_present_flag
            colour_ mapping_enabled_flag )
            if( colour_mapping_enabled_flag )
                colour_mapping_table(Y)
                colour_mapping_table(U)
                colour_mapping_table(V)
        }
        :
    }
}
```

The roles of parameters included in the function colour_mapping_table(component) shown in Table 5 may be the same as the roles of the parameters of the same names described with reference to Table 2. A function colour_mapping_octants( ) is a recursive function. The recursive function colour_mapping_octants( ) in Table 5 has an additional argument "component" compared to the function of the same name shown in Table 2. The additional argument is the same as the identifier of the color component input to the function colour_mapping_table( ).

TABLE 5

Example of Modified Syntax
of Color Mapping Table

```
colour_mapping_table(component) {
    cm_octant_depth
    cm_y_part_num_log2
    cm_input_luma_bit_depth_minus8
    cm_input_chroma_bit_depth _delta
    cm_output_luma_bit_depth_minus8
    cm_output_chroma_bit_depth _delta
    cm_res_quant_bits
    colour_mapping_octants(0,0,0,0,1<<cm_octant_depth, component)
}
```

A function colour_mapping_octants( ) shown in Table 6 is formed by a first half (2nd to 10th lines) including the granularity information and a second half (11th to 19th lines) including the predicted value information. The granularity information includes a split flag split_octant_flag set that is designated recursively and defines the splitting of the color space of the base layer. A difference of the granularity information from the syntax shown in Table 3 is that the function colour_mapping_table(component) is called separately for each color component (see Table 4) and the split flag set (that is, the granularity information) of Table 6 is also consequently defined separately for each color component. When a certain cuboid partition is not further split (that is, the corresponding split flag indicates "false"), the predicted value information specifies a partial space of the color space of the enhancement layer corresponding to this cuboid partition by indicating the vertex positions of this partial space. A difference of the predicted value information from the syntax shown in Table 3 is that the parameters of the vertex positions accommodated in a one-time loop of the variable vertex are aggregated in one parameter res_component (a character string "component" is substituted with the identifier of "Y," "U," or "V" of the color component).

TABLE 6

Example of Modified Syntax
of Recursive Portion of Color Mapping Table

```
colour_mapping_octants( depth, yIdx, uIdx, vIdx, length, component ) {
    if ( depth < cm_octant_depth )
        split_octant_flag
    if ( split_octant_flag ) {
        for( k=0; k < 2; k++ )
            for( m=0; m < 2 ; m++)
                for( n=0; n < 2; n++ )
                    colour_mapping_octants( depth+1, yIdx+YPartNum * k * length/2,
                        uIdx+m * length/2, vIdx+n * length/2, length/2)
    }
    else {
        for( i=0; i < YPartNum; i++ )
            for( vertex=0: vertex < 4; vertex++ ) {
                coded_vertex_flag[yIdx+i][uIdx][vIdx][vertex]
                if( coded_vertex_flag[yIdx+i][uIdx][vIdx][vertex] ) {
                    res_component[Idx+i][uIdx][vIdx][vertex]
                }
            }
    }
}
```

The syntaxes shown in Table 4 to Table 6 are merely examples. Some of the parameters may be omitted or other additional parameters may be used. For example, the inter layer prediction section 40 may generate a flag indicating whether the granularity information for the LUT_U (or the LUT_V) is encoded as an additional parameter to be encoded, apart from the granularity information for the LUT_Y, or may generate a flag indicating whether the granularity information for the LUT_V is encoded as an additional parameter to be encoded, apart from the granularity information for the LUT_U. When it is not necessary to separately define the granularity of the space splitting for the color components, the flags can indicate "false."

3. Flow of Encoding Process According to Embodiment 3-1. Schematic Flow

FIG. 9 is a flowchart illustrating an example of a schematic flow of an encoding process according to an embodiment. The description of process steps not directly relating to the technology of the present disclosure is omitted in the drawings for brevity.

FIG. 9 illustrates that, first of all, the BL encoding section 1*a* executes an encoding process on a base layer, and generates an encoded stream of the base layer (step S11).

The common memory 2 buffers the image (one or both of the decoded image and the predicted error image) of the base layer generated through the encoding process of the base layer and the parameters reused between the layers (step S12). The parameters reused between the layers can include, for example, resolution information and identification information (for example, one or more pieces of the color gamut information, the dynamic range information, and the bit depth information) identifying the pixel attribute.

Next, the EL encoding section 1b performs the encoding process of the enhancement layer to generate the encoded stream of the enhancement layer (step S13). In the encoding process of the enhancement layer executed herein, the inter layer prediction section 40 converts the image of the base layer buffered in the common memory 2 into the predicted image using two or more lookup tables of which the granularity of the space splitting can differ. The predicted image after the conversion can be used as the reference image in the enhancement layer.

Next, the multiplexing section 3 multiplexes the encoded stream of the base layer generated by the BL encoding section 1a and the encoded stream of the enhancement layer generated by the EL encoding section 1b to generate a multiplexed stream of a multi-layer (step S14).

3-2. Spatial Splitting Process

FIG. 10 is a flowchart illustrating an example of a flow of a spatial splitting process at the time of encoding. Referring to FIG. 10, the inter layer prediction section 40 first initializes control variables. For example, the value of a variable $R_{min}$ maintaining the minimum cost value and a depth of the splitting can be initialized to zero (the initial state of recursion corresponds to "no splitting").

Next, the inter layer prediction section 40 decides the partial space of the enhancement layer corresponding to the partition (one partition occupying the entire color space of the base layer) of the base layer in the case of "no splitting" (step S13). For example, the inter layer prediction section 40 can decide the corresponding partial space of the enhancement layer based on correlation between the original image of the enhancement layer and a reconstructed image of the base layer (subjected to the upsampling, as necessary).

Next, the inter layer prediction section 40 calculates an encoding cost (R) in the case of "no splitting" based on a prediction error and an assumed encoding amount and updates the minimum cost with the calculation result ($R_{min} \leftarrow R$) (step S15)

The subsequent processes of step S19 to step S29 are repeated until it is determined that there is no splittable partition (step S17). The inter layer prediction section 40 first splits any partition of interest during the repetition (step S19). Herein, the splitting may be octant splitting (splitting into 2×2×2 sub-partitions) or additional splitting of only the Y component axis. Next, the inter layer prediction section 40 decides the partial space of the enhancement layer corresponding to each of the sub-partitions formed through the splitting (step S21). Next, the inter layer prediction section 40 calculates an encoding cost (R) to which the splitting of step S19 is reflected based on the prediction error and the assumed encoding amount (step S23). The inter layer prediction section 40 compares the calculated encoding cost to the minimum cost at that time (step S25). When the calculated encoding cost is less than the minimum cost, the inter layer prediction section 40 updates the minimum cost to the calculated encoding cost ($R_{min} \leftarrow R$) and sets the split flag of the partition of interest to be true (step S27). Conversely, when the calculated encoding cost is not less than the minimum cost at that time, the inter layer prediction section 40 sets the split flag of the partition of interest to be false without updating the minimum cost (step S29).

Such a process is recursively repeated until the depth of the splitting reaches the upper limit or the minimum cost is not updated. As a result, granularity information on one table including the split flag set is generated. The partial space of the enhancement layer corresponding to each cuboid partition after the splitting is decided.

3-3. Table Information Encoding Process

(1) Scheme of Related Art

FIG. 11 is a flowchart illustrating an example of a flow of a table information encoding process according to a scheme of the related art. Referring to FIG. 1, first, the space splitting process exemplified in FIG. 10 is executed once commonly on the luma component (Y), the first chroma component (U), and the second chroma component (V) of the enhancement layer (step S110).

Next, based on the result of the space splitting process, the granularity information common to the three color components of the enhancement layer is encoded (step S120). The predicted value information for the luma component of the enhancement layer, the predicted value information for the first chroma component, and the predicted value information for the second chroma component decided in the space splitting process are each encoded (steps S122, S124, and S126). The syntaxes of granularity information and the predicted value information can be formatted, as shown in Table 1 to Table 3 above.

(2) Novel Scheme

FIG. 12 is a flowchart illustrating an example of a flow of a table information encoding process according to a novel scheme of the above-described embodiment.

Referring to FIG. 12, the inter layer prediction section 40 first executes the space splitting process to decide the granularity of the space splitting of the lookup table (LUT_Y) for the luma component (Y) of the enhancement layer (step S112). The inter layer prediction section 40 executes the space splitting process to decide the granularity of space splitting of the lookup table (LUT_U) for the first chroma component (U) of the enhancement layer (step S114). The inter layer prediction section 40 executes the space splitting process to decide the granularity of space splitting of the lookup table (LUT_V) for the second chroma component (V) of the enhancement layer (step S116).

Next, the lossless encoding section 16 encodes the first granularity information for the LUT_Y based on the result of the space splitting process of step S112 (step S130) and encodes the first predicted value information for the LUT_Y (step S135). The lossless encoding section 16 encodes the second granularity information for the LUT_U based on the result of the space splitting process of step S114 (step S140) and encodes the second predicted value information for the LUT_U (step S145). The lossless encoding section 16 encodes the third granularity information for the LUT_V based on the result of the space splitting process of step S116 (step S150) and encodes the third predicted value information for the LUT_V (step S155).

For the color component for which the lookup table is common to the other color components, the lookup table information unique to this color component may not be encoded. An additional parameter indicating whether the lookup table is common may be encoded.

4. Configuration Example of El Decoding Section According to Embodiment

FIG. 13 is a block diagram illustrating an example of a configuration of the EL decoding section 6b illustrated in FIG. 7. Referring to FIG. 13, the EL decoding section 6b includes an accumulation buffer 61, a lossless decoding section 62, an inverse quantization section 63, an inverse orthogonal transform section 64, an addition section 65, a loop filter 66, a reordering buffer 67, a digital-to-analogue (D/A) conversion section 68, a frame memory 69, selectors 70 and 71, an intra prediction section 80, an inter prediction section 85, an inter layer prediction section 90, and an LUT buffer 95.

The accumulation buffer 61 uses a storage medium to temporarily accumulate an encoded stream of an enhancement layer input from the inverse multiplexing section 5.

The lossless decoding section 62 decodes the quantized data of the enhancement layer according to an encoding scheme used at the time of the encoding from the encoded stream of the enhancement layer input from the accumulation buffer 61. The lossless decoding section 62 decodes the information inserted into the header region of the encoded stream. The information decoded by the lossless decoding section 62 can include, for example, the information on the intra prediction, the information on the inter prediction, and the information on the inter layer prediction. The lossless decoding section 62 outputs the quantized data to the inverse quantization section 63. The lossless decoding section 62 outputs the information on the intra prediction to the intra prediction section 80. The lossless decoding section 62 outputs the information on the inter prediction to the inter prediction section 85. The lossless decoding section 62 outputs the information on the inter layer prediction including the lookup table information which can define two or more lookup tables with different granularity to the inter layer prediction section 90.

The inverse quantization section 63 inversely quantizes the quantized data input from the lossless decoding section 62 in the same quantization step as the step used at the time of the encoding to restore the transform coefficient data of the enhancement layer. The inverse quantization section 63 outputs the restored transform coefficient data to the inverse orthogonal transform section 64.

The inverse orthogonal transform section 64 generates predicted error data by performing inverse orthogonal transform on transform coefficient data input from the inverse quantization section 63 in accordance with the orthogonal transform scheme used for encoding. The inverse orthogonal transform section 64 then outputs the generated predicted error data to the addition section 65.

The addition section 65 adds the predicted error data input from the inverse orthogonal transform section 64 and the predicted image data input from the selector 71 to generate decoded image data. The addition section 65 then outputs the generated decoded image data to the loop filter 66 and the frame memory 69.

The loop filter 66 includes a deblocking filter that reduces block distortion and a sample adaptation offset filter that adds an offset value to each pixel value, as in the loop filter 24 of the EL encoding section 1b. The loop filter 66 filters the decoded image data input from the addition section 65 and outputs the decoded image data after the filtering to the reordering buffer 67 and the frame memory 69.

The reordering buffer 67 generates a chronological series of image data by reordering images input from the loop filter 66. The reordering buffer 67 then outputs the generated image data to the D/A conversion section 68.

The D/A conversion section 68 converts the image data in a digital format input from the reordering buffer 67 into an image signal in an analogue format. The D/A conversion section 68 then causes an image of the enhancement layer to be displayed by outputting the analogue image signal to a display (not illustrated) connected to the image decoding device 60, for example.

The frame memory 69 uses a storage medium to store the decoded image data before the filtering input from the addition section 65, the decoded image data after the filtering input from the loop filter 66, and the reference image data generated by the inter layer prediction section 90.

The selector 70 switches the output destination of the image data from the frame memory 69 between the intra prediction section 80 and the inter prediction section 85 for each block in the image in accordance with mode information acquired by the lossless decoding section 62. For example, when the intra prediction mode is designated, the selector 70 outputs the decoded image data that has been supplied from the frame memory 69 and has not yet been filtered to the intra prediction section 80 as reference image data. When the inter prediction mode is designated, the selector 70 outputs the filtered decoded image data to the inter prediction section 85 as reference image data. When the image based on the inter layer prediction is used in the intra prediction section 80 or the inter prediction section 85, the selector 70 supplies the reference image data generated by the inter layer prediction section 40 to the intra prediction section 80 or the inter prediction section 85.

The selector 71 switches the output source of the predicted image data to be supplied to the addition section 65 between the intra prediction section 80 and the inter prediction section 85 in accordance with the mode information acquired by the lossless decoding section 62. For example, when the intra prediction mode is designated, the selector 71 supplies the predicted image data output from the intra prediction section 80 to the addition section 65. When the inter prediction mode is designated, the selector 71 supplies the predicted image data output from the inter prediction section 85 to the addition section 65.

The intra prediction section 80 performs the intra prediction process of the enhancement layer based on the information on the intra prediction input from the lossless decoding section 62 and the reference image data from the frame memory 69 to generate predicted image data. The intra prediction process is performed for each PU. When the intra BL prediction or the intra residual prediction is designated as the intra prediction mode, the intra prediction section 80 uses an image generated by the inter layer prediction section 90 as a reference image. The intra prediction section 80 outputs the generated predicted image data of the enhancement layer to the selector 71.

The inter prediction section 85 performs the inter prediction process (motion compensation process) of the enhancement layer based on the information on the inter prediction input from the lossless decoding section 62 and the reference image data from the frame memory 69 to generate predicted image data. The inter prediction process is performed for each PU. When the inter residual prediction is designated as the inter prediction mode, the inter prediction section 85 uses the image generated by the inter layer prediction section 90 as a reference image. The inter prediction section 85 outputs the generated predicted image data of the enhancement layer to the selector 71.

The inter layer prediction section 90 performs upsampling on the image (the decoded image or the predicted error image) of the base layer buffered by the common memory 7 according to a resolution ratio of the base layer to the enhancement layer. When the image of the enhancement layer has a different pixel attribute from the image of the base layer, the inter layer prediction section 90 converts the pixel value of each pixel of the base layer subjected to the upsampling into a predicted value pixel of the enhancement layer using a lookup table (LUT). Herein, the pixel attribute includes at least one of a color gamut, a bit depth, and a dynamic range. The inter layer prediction section 90 reconstructs the lookup table to be used for the inter layer prediction based on the information on the inter layer prediction input from the lossless decoding section 62. In an embodiment, the information on the inter layer prediction includes the lookup table information which can define two or more lookup tables which have different granularity and are used to acquire predicted values of different color components, as described above.

For example, first lookup table information includes not only granularity information that defines the granularity of the LUT (LUT_Y) for the luma component (Y) but also the predicted value information corresponding to each cuboid partition of the LUT_Y. Second lookup table information includes not only granularity information that defines the LUT (LUT_U) for the first chroma component (U) but also predicted value information corresponding to each cuboid partition of the LUT_U. The syntaxes of the lookup table information may be, for example, the syntaxes shown in Table 4 to Table 6. However, some of the parameters may be omitted from the syntaxes or other additional parameters may be used. The second lookup table information may be decoded only when a parameter indicating that the granularity information for the LUT_U is encoded separately from the granularity information for the LUT_Y is decoded. Third lookup table information including the predicted value information corresponding to each cuboid partition of the LUT_V can be decoded along with granularity information that defines the granularity of the LUT (LUT_V) for the second chroma component (V). The third lookup table information may be decoded only when a parameter indicating that the granularity information for the LUT_V is encoded separately from the granularity information for the LUT_U is decoded.

The inter layer prediction section 90 can acquire a predicted value of the luma component of the enhancement layer using the LUT_Y, acquire a predicted value of the first chroma component of the enhancement layer using the LUT_U, and acquire a predicted value of the second chroma component of the enhancement layer using the LUT_V. The granularity information defining the granularity of the space splitting of these lookup tables is separately decoded. This means that the granularity of each space splitting can be differently defined. A predicted image generated using two or more lookup tables by the inter layer prediction section 90 can be stored in the frame memory 69 to be used as a reference image by the intra prediction section 80 or the inter prediction section 85.

The LUT buffer 95 is a buffer that buffers two or more lookup tables (two or more of the LUT_Y, the LUT_U, and the LUT_V) used by the inter layer prediction section 90. In each lookup table, combinations of the luma component (Y), the first chroma component (U), and the second chroma component (V) of the base layer are mapped to predicted pixel values of the enhancement layer corresponding to the combinations.

5. Flow of Decoding Process According to Embodiment

5-1. Schematic Flow

FIG. 14 is a flowchart illustrating an example of a schematic flow of a decoding process according to an embodiment. The description of process steps not directly relating to the technology according to the present disclosure is omitted in the drawings for brevity.

FIG. 14 illustrates that, first of all, the inverse multiplexing section 5 inversely multiplexes a multiplexed stream of a multi-layer to obtain an encoded stream of a base layer and an encoded stream of an enhancement layer (step S60).

Next, the BL decoding section 6a executes a decoding process on the base layer, and reconstructs a base layer image from the encoded stream of the base layer (step S61).

The common memory 7 buffers the image (one or both of the decoded image and the predicted error image) of the base layer generated through the decoding process of the base layer and the parameters reused between the layers (step S62). The parameters reused between the layers can include, for example, resolution information and identification information (for example, one or more of the color gamut information, the dynamic range information, and the bit depth information) identifying the pixel attribute.

Next, the EL decoding section 6b executes the decoding process of the enhancement layer to reconstruct the enhancement layer image (step S63). In the decoding process of the enhancement layer executed here, the inter layer prediction section 90 converts the image of the base layer buffered in the common memory 7 into the predicted image using two or more lookup tables of which the granularity of the space splitting can differ. The predicted image after the conversion can be used as the reference image in the enhancement layer.

5-2. Table Reconstruction Process

(1) Scheme of Related Art

FIG. 15 is a flowchart illustrating an example of a flow of the table reconstruction process according to a scheme of the related art. Referring to FIG. 15, the common granularity information is first decoded for the luma component (Y), the first chroma component (U), and the second chroma component (V) of the enhancement layer (step S220). The granularity information decoded herein can include the split flag set that defines the splitting of the color space of the base layer in addition to the parameter indicating the upper limit of the depth of the splitting. Next, the predicted value information for the luma component, the predicted value information for the first chroma component, and the predicted value information for the second chroma component are each decoded (steps S222, S224, and S226).

Next, one or more cuboid partitions for one LUT are commonly set by splitting the color space of the base layer according to the granularity information decoded in step S220 (step S262). Next, the partial space of the enhancement layer corresponding to each of the cuboid partitions set in step S262 is set according to the predicted value information for the three color components (step S264).

(2) Novel Scheme

FIG. 16 is a flowchart illustrating an example of a flow of the table reconstruction process according to a novel scheme according to the above-described embodiment.

Referring to FIG. 16, the lossless decoding section 62 first decodes the granularity information on the LUT_Y which is the lookup table referred to when the predicted value of the luma component (Y) of the enhancement layer is acquired (step S230). The lossless decoding section 62 decodes the predicted value information on the LUT_Y (step S232). Next, the inter layer prediction section 90 sets one or more cuboid partitions for the LUT_Y by splitting the color space of the base layer according to the granularity information decoded in step S230 (step S234). Next, the inter layer prediction section 90 sets the partial space of the enhancement layer corresponding to each of the set one or more cuboid partitions of the LUT_Y according to the predicted value information decoded in step S232 (step S236).

Next, the lossless decoding section 62 decodes the granularity information on the LUT_U which is the lookup table referred to when the predicted value of the first chroma component (U) of the enhancement layer is acquired (step S240). The lossless decoding section 62 decodes the predicted value information on the LUT_U (step S242). Next, the inter layer prediction section 90 sets one or more cuboid partitions for the LUT_U by splitting the color space of the base layer according to the granularity information decoded in step S240 (step S244). Next, the inter layer prediction section 90 sets the partial space of the enhancement layer corresponding to each of the set one or more cuboid partitions of the LUT_U according to the predicted value information decoded in step S242 (step S246).

Next, the lossless decoding section 62 decodes the granularity information on the LUT_V which is the lookup table referred to when the predicted value of the second chroma component (V) of the enhancement layer is acquired (step S250). The lossless decoding section 62 decodes the predicted value information on the LUT_V (step S252). Next, the inter layer prediction section 90 sets one or more cuboid partitions for the LUT_V by splitting the color space of the base layer according to the granularity information decoded in step S250 (step S254). Next, the inter layer prediction section 90 sets the partial space of the enhancement layer corresponding to each of the set one or more cuboid partitions of the LUT_V according to the predicted value information decoded in step S252 (step S256).

For the color component for which the lookup table is common to the other color components, the lookup table information unique to this color component may not be decoded and the lookup table based on the lookup table information may not be set. An additional parameter indicating whether the lookup table is common may be decoded and the table reconstruction process may be branched according to the additional parameter.

The inter layer prediction section 90 can execute the inter layer prediction using the two or more reconstructed lookup tables. For example, the inter layer prediction section 90 can determine the partition to which an input pixel vector belongs among the one or more cuboid partitions of the LUT_Y and acquire the predicted pixel value of the Y component through linear interpolation based on the pixel values of the vertexes of the partial space of the enhancement layer corresponding to the determined partition. Not only the predicted pixel value of the U component but also the predicted pixel value of the V component can be similarly acquired using the LUT_U and the LUT_V, respectively. As the result obtained by executing the conversion on each pixel, a predicted image of the inter layer prediction is generated.

6. Applications

6-1. Application to Various Products

The image encoding device 10 and the image decoding device 60 according to an embodiment may be applied to various electronic devices such as transmitters and receivers for satellite broadcasting, cable broadcasting such as cable TV, distribution on the Internet, distribution to terminals via cellular communication and the like, recording devices that record images in a medium such as optical discs, magnetic disks and flash memory, and reproduction devices that reproduce images from such storage medium. Four applications will be described below.

(1) First Application

FIG. 17 illustrates an example of a schematic configuration of a television device to which an embodiment is applied. A television device 900 includes an antenna 901, a tuner 902, a demultiplexer 903, a decoder 904, an video signal processing section 905, a display section 906, an audio signal processing section 907, a speaker 908, an external interface 909, a control section 910, a user interface 911, and a bus 912.

The tuner 902 extracts a signal of a desired channel from broadcast signals received via the antenna 901, and demodulates the extracted signal. The tuner 902 then outputs an encoded bit stream obtained through the demodulation to the demultiplexer 903. That is, the tuner 902 serves as a transmission mechanism of the television device 900 for receiving an encoded stream in which an image is encoded.

The demultiplexer 903 demultiplexes the encoded bit stream to obtain a video stream and an audio stream of a program to be viewed, and outputs each demultiplexed stream to the decoder 904. The demultiplexer 903 also extracts auxiliary data such as electronic program guides (EPGs) from the encoded bit stream, and supplies the extracted data to the control section 910. Additionally, the demultiplexer 903 may perform descrambling when the encoded bit stream has been scrambled.

The decoder 904 decodes the video stream and the audio stream input from the demultiplexer 903. The decoder 904 then outputs video data generated in the decoding process to the video signal processing section 905. The decoder 904 also outputs the audio data generated in the decoding process to the audio signal processing section 907.

The video signal processing section 905 reproduces the video data input from the decoder 904, and causes the display section 906 to display the video. The video signal processing section 905 may also cause the display section 906 to display an application screen supplied via a network. Further, the video signal processing section 905 may perform an additional process such as noise removal, for example, on the video data in accordance with the setting. Furthermore, the video signal processing section 905 may generate an image of a graphical user interface (GUI) such as a menu, a button and a cursor, and superimpose the generated image on an output image.

The display section 906 is driven by a drive signal supplied from the video signal processing section 905, and displays a video or an image on a video screen of a display device (e.g. liquid crystal display, plasma display, OLED, etc.).

The audio signal processing section 907 performs a reproduction process such as D/A conversion and amplification on the audio data input from the decoder 904, and outputs a sound from the speaker 908. The audio signal processing section 907 may also perform an additional process such as noise removal on the audio data.

The external interface 909 is an interface for connecting the television device 900 to an external device or a network. For example, a video stream or an audio stream received via the external interface 909 may be decoded by the decoder 904. That is, the external interface 909 also serves as a transmission mechanism of the television device 900 for receiving an encoded stream in which an image is encoded.

The control section 910 includes a processor such as a central processing unit (CPU), and a memory such as random access memory (RAM) and read only memory (ROM). The memory stores a program to be executed by the CPU, program data, EPG data, data acquired via a network, and the like. The program stored in the memory is read out and executed by the CPU at the time of activation of the television device 900, for example. The CPU controls the operation of the television device 900, for example, in accordance with an operation signal input from the user interface 911 by executing the program.

The user interface 911 is connected to the control section 910. The user interface 911 includes, for example, a button and a switch used for a user to operate the television device 900, and a receiving section for a remote control signal. The user interface 911 detects an operation of a user via these structural elements, generates an operation signal, and outputs the generated operation signal to the control section 910.

The bus 912 connects the tuner 902, the demultiplexer 903, the decoder 904, the video signal processing section 905, the audio signal processing section 907, the external interface 909, and the control section 910 to each other.

In the television device 900 with the above-described configuration, the decoder 904 has the function of the image decoding device 60 according to the above-described embodiment. Thus, when the television device 900 executes the inter layer prediction using the lookup table scheme between the layers with the mutually different pixel attributes, the plurality of lookup tables of which the granularity of the space splitting differs can be used properly for each color component.

(2) Second Application

FIG. 18 illustrates an example of a schematic configuration of a mobile phone to which an embodiment is applied. A mobile phone 920 includes an antenna 921, a communication section 922, an audio codec 923, a speaker 924, a microphone 925, a camera section 926, an image processing section 927, a demultiplexing section 928, a recording/reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 connects the communication section 922, the audio codec 923, the camera section 926, the image processing section 927, the demultiplexing section 928, the recording/reproduction section 929, the display section 930, and the control section 931 to each other.

The mobile phone 920 performs an operation such as transmission and reception of an audio signal, transmission and reception of email or image data, image capturing, and recording of data in various operation modes including an audio call mode, a data communication mode, an image capturing mode, and a videophone mode.

An analogue audio signal generated by the microphone 925 is supplied to the audio codec 923 in the audio call mode. The audio codec 923 converts the analogue audio signal into audio data, has the converted audio data subjected to the A/D conversion, and compresses the converted data. The audio codec 923 then outputs the compressed audio data to the communication section 922. The communication section 922 encodes and modulates the audio data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal, generates audio data, and outputs the generated audio data to the audio codec 923. The audio codec 923 extends the audio data, has the audio data subjected to the D/A conversion, and generates an analogue audio signal. The audio codec 923 then supplies the generated audio signal to the speaker 924 to output a sound.

The control section 931 also generates text data in accordance with an operation made by a user via the operation section 932, the text data, for example, composing email. Moreover, the control section 931 causes the display section 930 to display the text. Furthermore, the control section 931 generates email data in accordance with a transmission instruction from a user via the operation section 932, and outputs the generated email data to the communication section 922. The communication section 922 encodes and modulates the email data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal to restore the email data, and outputs the restored email data to the control section 931. The control section 931 causes the display section 930 to display the content of the email, and also causes the storage medium of the recording/reproduction section 929 to store the email data.

The recording/reproduction section 929 includes a readable and writable storage medium. For example, the storage medium may be a built-in storage medium such as RAM and flash memory, or an externally mounted storage medium such as hard disks, magnetic disks, magneto-optical disks, optical discs, USB memory, and memory cards.

Furthermore, the camera section 926, for example, captures an image of a subject to generate image data, and outputs the generated image data to the image processing section 927 in the image capturing mode. The image processing section 927 encodes the image data input from the camera section 926, and causes the storage medium of the recording/reproduction section 929 to store the encoded stream.

Furthermore, the demultiplexing section 928, for example, demultiplexes a video stream encoded by the image processing section 927 and an audio stream input from the audio codec 923, and outputs the demultiplexed stream to the communication section 922 in the videophone mode. The communication section 922 encodes and modulates the stream, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. These transmission signal and received signal may include an encoded bit stream. The communication section 922 then demodulates and decodes the received signal to restore the stream, and outputs the restored stream to the demultiplexing section 928. The demultiplexing section 928 demultiplexes the input stream to obtain a video stream and an audio stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 extends the audio stream, has the audio stream subjected to the D/A conversion, and generates an analogue audio signal. The audio codec 923 then supplies the generated audio signal to the speaker 924, and causes a sound to be output.

In the mobile phone 920 with the above-described configuration, the image processing section 927 has the functions of the image encoding device 10 and the image decoding device 60 according to the above-described embodiment. Thus, when the mobile phone 920 executes the inter layer prediction using the lookup table scheme between the layers with the mutually different pixel attributes, the plurality of lookup tables of which the granularity of the space splitting differs can be used properly for each color component.

(3) Third Application

FIG. 19 illustrates an example of a schematic configuration of a recording/reproduction device to which an embodiment is applied. A recording/reproduction device 940, for example, encodes audio data and video data of a received broadcast program and records the encoded audio data and the encoded video data in a recording medium. For example, the recording/reproduction device 940 may also encode audio data and video data acquired from another device and record the encoded audio data and the encoded video data in a recording medium. Furthermore, the recording/reproduction device 940, for example, uses a monitor or a speaker to reproduce the data recorded in the recording medium in accordance with an instruction of a user. At this time, the recording/reproduction device 940 decodes the audio data and the video data.

The recording/reproduction device 940 includes a tuner 941, an external interface 942, an encoder 943, a hard disk drive (HDD) 944, a disc drive 945, a selector 946, a decoder 947, an on-screen display (OSD) 948, a control section 949, and a user interface 950.

The tuner 941 extracts a signal of a desired channel from broadcast signals received via an antenna (not shown), and demodulates the extracted signal. The tuner 941 then outputs an encoded bit stream obtained through the demodulation to the selector 946. That is, the tuner 941 serves as a transmission mechanism of the recording/reproduction device 940.

The external interface 942 is an interface for connecting the recording/reproduction device 940 to an external device or a network. For example, the external interface 942 may be an IEEE 1394 interface, a network interface, an USB interface, a flash memory interface, or the like. For example, video data and audio data received via the external interface 942 are input to the encoder 943. That is, the external interface 942 serves as a transmission mechanism of the recording/reproduction device 940.

When the video data and the audio data input from the external interface 942 have not been encoded, the encoder 943 encodes the video data and the audio data. The encoder 943 then outputs an encoded bit stream to the selector 946.

The HDD 944 records, in an internal hard disk, the encoded bit stream in which content data of a video and a sound is compressed, various programs, and other pieces of data. The HDD 944 also reads out these pieces of data from the hard disk at the time of reproducing a video or a sound.

The disc drive 945 records and reads out data in a recording medium that is mounted. The recording medium that is mounted on the disc drive 945 may be, for example, a DVD disc (DVD-Video, DVD-RAM, DVD-R, DVD-RW, a DVD+R, DVD+RW, etc.), a Blu-ray (registered trademark) disc, or the like.

The selector 946 selects, at the time of recording a video or a sound, an encoded bit stream input from the tuner 941 or the encoder 943, and outputs the selected encoded bit stream to the HDD 944 or the disc drive 945. The selector 946 also outputs, at the time of reproducing a video or a sound, an encoded bit stream input from the HDD 944 or the disc drive 945 to the decoder 947.

The decoder 947 decodes the encoded bit stream, and generates video data and audio data. The decoder 947 then outputs the generated video data to the OSD 948. The decoder 904 also outputs the generated audio data to an external speaker.

The OSD 948 reproduces the video data input from the decoder 947, and displays a video. The OSD 948 may also superimpose an image of a GUI such as a menu, a button, and a cursor on a displayed video.

The control section 949 includes a processor such as a CPU, and a memory such as RAM and ROM. The memory stores a program to be executed by the CPU, program data, and the like. For example, a program stored in the memory is read out and executed by the CPU at the time of activation of the recording/reproduction device 940. The CPU controls the operation of the recording/reproduction device 940, for example, in accordance with an operation signal input from the user interface 950 by executing the program.

The user interface 950 is connected to the control section 949. The user interface 950 includes, for example, a button and a switch used for a user to operate the recording/reproduction device 940, and a receiving section for a remote control signal. The user interface 950 detects an operation made by a user via these structural elements, generates an operation signal, and outputs the generated operation signal to the control section 949.

In the recording/reproduction device 940 with the above-described configuration, the encoder 943 has the function of the image encoding device 10 according to the above-described embodiment. The decoder 947 has the function of the image decoding device 60 according to the above-described embodiment. Thus, when the recording/reproduction device 940 executes the inter layer prediction using the lookup table scheme between the layers with the mutually different pixel attributes, the plurality of lookup tables of which the granularity of the space splitting differs can be used properly for each color component.

(4) Fourth Application

FIG. 20 illustrates an example of a schematic configuration of an image capturing device to which an embodiment is applied. An image capturing device 960 captures an image of a subject to generate an image, encodes the image data, and records the image data in a recording medium.

The image capturing device 960 includes an optical block 961, an image capturing section 962, a signal processing section 963, an image processing section 964, a display section 965, an external interface 966, a memory 967, a media drive 968, an OSD 969, a control section 970, a user interface 971, and a bus 972.

The optical block 961 is connected to the image capturing section 962. The image capturing section 962 is connected to the signal processing section 963. The display section 965 is connected to the image processing section 964. The user interface 971 is connected to the control section 970. The bus 972 connects the image processing section 964, the external interface 966, the memory 967, the media drive 968, the OSD 969, and the control section 970 to each other.

The optical block 961 includes a focus lens, an aperture stop mechanism, and the like. The optical block 961 forms an optical image of a subject on an image capturing surface of the image capturing section 962. The image capturing section 962 includes an image sensor such as a CCD and CMOS, and converts the optical image formed on the image capturing surface into an image signal which is an electrical signal through photoelectric conversion. The image capturing section 962 then outputs the image signal to the signal processing section 963.

The signal processing section 963 performs various camera signal processes such as knee correction, gamma correction, and color correction on the image signal input from the image capturing section 962. The signal processing section 963 outputs the image data subjected to the camera signal process to the image processing section 964.

The image processing section 964 encodes the image data input from the signal processing section 963, and generates encoded data. The image processing section 964 then outputs the generated encoded data to the external interface 966 or the media drive 968. The image processing section 964 also decodes encoded data input from the external interface 966 or the media drive 968, and generates image data. The image processing section 964 then outputs the generated image data to the display section 965. The image processing section 964 may also output the image data input from the signal processing section 963 to the display section 965, and cause the image to be displayed. Furthermore, the image processing section 964 may superimpose data for display acquired from the OSD 969 on an image to be output to the display section 965.

The OSD 969 generates an image of a GUI such as a menu, a button, and a cursor, and outputs the generated image to the image processing section 964.

The external interface 966 is configured, for example, as an USB input/output terminal. The external interface 966 connects the image capturing device 960 and a printer, for example, at the time of printing an image. A drive is further connected to the external interface 966 as necessary. A removable medium such as magnetic disks and optical discs is mounted on the drive, and a program read out from the removable medium may be installed in the image capturing device 960. Furthermore, the external interface 966 may be configured as a network interface to be connected to a network such as a LAN and the Internet. That is, the external interface 966 serves as a transmission mechanism of the image capturing device 960.

A recording medium to be mounted on the media drive 968 may be a readable and writable removable medium such as magnetic disks, magneto-optical disks, optical discs, and semiconductor memory. The recording medium may also be fixedly mounted on the media drive 968, configuring a non-transportable storage section such as built-in hard disk drives or a solid state drives (SSDs).

The control section 970 includes a processor such as a CPU, and a memory such as RAM and ROM. The memory stores a program to be executed by the CPU, program data, and the like. A program stored in the memory is read out and executed by the CPU, for example, at the time of activation of the image capturing device 960. The CPU controls the operation of the image capturing device 960, for example, in accordance with an operation signal input from the user interface 971 by executing the program.

The user interface 971 is connected to the control section 970. The user interface 971 includes, for example, a button, a switch, and the like used for a user to operate the image capturing device 960. The user interface 971 detects an operation made by a user via these structural elements, generates an operation signal, and outputs the generated operation signal to the control section 970.

In the image capturing device 960 with the above-described configuration, the image processing section 964 has the functions of the image encoding device 10 and the image decoding device 60 according to the above-described embodiment. Thus, when the image capturing device 960 executes the inter layer prediction using the lookup table scheme between the layers with the mutually different pixel attributes, the plurality of lookup tables of which the granularity of the space splitting differs can be used properly for each color component.

6-2. Various Purposes of Scalable Video Coding

The advantages of the above-described scalable video coding can be realized for various purposes. Examples of three such purposes will be described below.

(1) First Example

In a first example, the scalable video coding is used to selectively transmit data. Referring to FIG. 21, a data transmission system 1000 includes a stream storage device 1001 and a delivery server 1002. The delivery server 1002 is connected to several terminal devices via a network 1003. The network 1003 may be a wired network, may be a wireless network, or may be a combination of a wired network and a wireless network. FIG. 21 illustrates a personal computer (PC) 1004, an AV device 1005, a tablet device 1006, and a mobile phone 1007 as examples of the terminal devices.

The stream storage device 1001 stores, for example, stream data 1011 including the multiplexed stream generated by the image encoding device 10. The multiplexed stream includes the encoded stream of the base layer (BL) and the encoded stream of the enhancement layer (EL). The delivery server 1002 reads the stream data 1011 stored in the stream storage device 1001 and delivers at least a part of the read stream data 1011 to the PC 1004, the AV device 1005, the tablet device 1006, and the mobile phone 1007 via the network 1003.

When the stream is delivered to the terminal devices, the delivery server 1002 selects the stream to be delivered based on a certain condition such as the performance of the terminal devices or a communication environment. For example, the delivery server 1002 may prevent delay or overflow in the terminal devices or overload of processors by not delivering the encoded stream with high image quality exceeding image quality which can be handled by the terminal devices. The delivery server 1002 may avoid occupation of a communication band of the network 1003 by not delivering the encoded stream with high image quality. On the other hand, when there are no risks to avoid or delivery of the multiplexed streams is determined to be appropriate based on contracts with users or certain conditions, the delivery server 1002 may deliver all of the multiplexed streams to the terminal devices.

In the example of FIG. 21, the delivery server 1002 reads the stream data 1011 from the stream storage device 1001. Then, the delivery server 1002 delivers the stream data 1011 to the PC 1004 having high processing performance without change. Since the AV device 1005 has low processing performance, the delivery server 1002 generates stream data 1012 including only the encoded stream of the base layer extracted from the stream data 1011 and delivers the stream data 1012 to the AV device 1005. The delivery server 1002 delivers the stream data 1011 to the tablet device 1006 capable of performing communication at a high communication rate without change. Since the mobile phone 1007 can perform communication only at a low communication rate, the delivery server 1002 delivers the stream data 1012 including only the encoded stream of the base layer to the mobile phone 1007.

By using the multiplexed stream in this way, it is possible to adaptively adjust the amount of traffic to be transmitted. The encoding amount of the stream data 1011 is reduced compared to a case in which the individual layers are independently encoded. Therefore, even when all of the stream data 1011 is delivered, the load imposed on the network 1003 is suppressed. The memory resources of the stream storage device 1001 are also saved.

The hardware performance of the terminal device differs in each device. The capabilities of applications to be executed in the terminal device are also diverse. The communication capacity of the network 1003 is also diverse. The capacity which can be used for data transmission can vary from time to time due to the presence of other traffic. Thus, before start of the delivery of the stream data, the delivery server 1002 may acquire network information on the communication capacity or the like of the network 1003 and terminal information on the hardware performance of the terminal device, the capability of the application, or the like through signaling with the terminal device of a delivery destination. Then, the delivery server 1002 can select the stream to be delivered based on the acquired information.

The layer to be decoded may be extracted in the terminal device. For example, the PC 1004 may display the base layer image extracted and decoded from the received multiplexed stream on its screen. The PC 1004 may extract the encoded stream of the base layer from the received multiplexed stream, generate the stream data 1012, and store the generated stream data 1012 in a storage medium or transmit the generated stream data 1012 to another device.

The configuration of the data transmission system 1000 illustrated in FIG. 21 is merely an example. The data transmission system 1000 may include any number of stream storage devices 1001, any number of delivery servers 1002, any number of networks 1003, and any number of terminal devices.

(2) Second Example

In a second example, the scalable video coding is used to transmit data via a plurality of communication channels. Referring to FIG. 22, a data transmission system 1100 includes a broadcast station 1101 and a terminal device 1102. The broadcast station 1101 broadcasts an encoded stream 1121 of a base layer on a terrestrial channel 1111. The broadcast station 1101 transmits an encoded stream 1122 of an enhancement layer to the terminal device 1102 via a network 1112.

The terminal device 1102 has a reception function of receiving a terrestrial broadcast broadcast by the broadcast station 1101 and receives the encoded stream 1121 of the base layer through the terrestrial channel 1111. The terminal device 1102 has a communication function of communicating with the broadcast station 1101 and receives the encoded stream 1122 of the enhancement layer via the network 1112.

For example, the terminal device 1102 may receive the encoded stream 1121 of the base layer according to an instruction from a user and decode the base layer image from the received encoded stream 1121 to display the base layer image on the screen. The terminal device 1102 may store the decoded base layer image in a storage medium or transmit the decoded base layer image to another device.

For example, the terminal device 1102 may receive the encoded stream 1122 of the enhancement layer via the network 1112 according to an instruction from a user and multiplex the encoded stream 1121 of the base layer and the encoded stream 1122 of the enhancement layer to generate the multiplexed stream. The terminal device 1102 may decode the enhancement layer image from the encoded stream 1122 of the enhancement layer to display the enhancement layer image on the screen. The terminal device 1102 may store the decoded enhancement layer image in a storage medium or transmit the decoded enhancement layer image to another device.

As described above, the encoded streams of the respective layers included in the multiplexed stream can be transmitted via different communication channels for each layer. Thus, by distributing the load imposed on the individual channels, it is possible to suppress occurrence of delay or overflow of the communication.

The communication channel to be used for the transmission may also be dynamically selected according to a certain condition. For example, the encoded stream 1121 of the base layer with a relatively large data amount can be transmitted through a communication channel with a broad bandwidth and the encoded stream 1122 of the enhancement layer with a relatively small data amount can be transmitted through a communication channel with a narrow bandwidth. The communication channel through which the encoded stream 1122 of a specific layer is transmitted may be switched according to the bandwidth of the communication channel. Thus, the load imposed on the individual channel can be efficiently suppressed.

The configuration of the data transmission system 1100 illustrated in FIG. 22 is merely an example. The data transmission system 1100 may include any number of communication channels and any number of terminal devices.

The configuration of the system described herein may be used for other purposes as well as the broadcast.

(3) Third Example

In a third example, the scalable video coding is used to store a video. Referring to FIG. 23, a data transmission system 1200 includes an image capturing device 1201 and a stream storage device 1202. The image capturing device 1201 performs the scalable video coding on image data generated by imaging a subject 1211 to generate a multiplexed stream 1221. The multiplexed stream 1221 includes an encoded stream of a base layer and an encoded stream of an enhancement layer. The image capturing device 1201 supplies the multiplexed stream 1221 to the stream storage device 1202.

The stream storage device 1202 stores the multiplexed stream 1221 supplied from the image capturing device 1201 so that the multiplexed stream 1221 is stored with different image quality for each mode. For example, in a normal mode, the stream storage device 1202 extracts an encoded stream 1222 of the base layer from the multiplexed stream 1221 and stores the extracted encoded stream 1222 of the base layer. In a high image quality mode, on the other hand, the stream storage device 1202 stores the multiplexed stream 1221 without change. Thus, the stream storage device 1202 can record a high image quality stream with a large data amount only when recording of a video with high image quality is preferred. Therefore, it is possible to save memory resources while suppressing an influence of deterioration in the image quality on a user.

For example, the image capturing device 1201 is assumed to be a monitoring camera. When a monitoring target (for example, an intruder) is not shown in a captured image, the normal mode is selected. In this case, since there is a high probability of the captured image being not important, a video is recorded with low image quality in preference to reduction in the data amount (that is, only the encoded stream 1222 of the base layer is stored). On the other hand, when a monitoring target (for example, the subject 1211 that is an intruder) is shown in a captured image, the high quality image mode is selected. In this case, since there is a high probability of the captured image being important, a video is recorded with high image quality in preference to the height of image quality (that is, the multiplexed stream 1221 is stored).

In the example of FIG. 23, the mode is selected, for example, based on an image analysis result by the stream storage device 1202. However, an embodiment of the present disclosure is not limited to this example, but the mode may be selected by the image capturing device 1201. In the latter case, the image capturing device 1201 may supply the encoded stream 1222 of the base layer to the stream storage device 1202 in the normal mode and may supply the multiplexed stream 1221 to the stream storage device 1202 in the high image quality mode.

A selection criterion for selecting the mode may be any criterion. For example, the mode may be switched according to the magnitude of audio acquired through a microphone, the waveform of audio, or the like. The mode may be switched periodically.

The mode may be switched according to an instruction from a user. The number of selectable modes may be any number as long as the number of modes does not exceed the number of layers to be hierarchized.

The configuration of the data transmission system 1200 illustrated in FIG. 23 is merely an example. The data transmission system 1200 may include any number of image capturing devices 1201. The configuration of the system described herein may be used for other purposes as well as the monitoring camera.

6-3. Others

(1) Application to Multi-View Codec

A multi-view codec is a type of multi-layer codec and is an image encoding scheme of encoding and decoding a so-called multi-view video. FIG. 24 is an explanatory diagram for describing the multi-view codec. Referring to FIG. 24, sequences of three view frames photographed at three viewpoints are illustrated. A view ID (view_id) is assigned to each view. Of the plurality of views, any one view is designated as a base view. The views other than the base view are referred to as non-base views. In the example of FIG. 24, a view with a view ID of "0" is the base view and two views with a view ID of "1" or "2" are the non-base views. When the views are encoded hierarchically, each view can correspond to the layer. As indicated by arrows in the drawing, images of the non-base views are encoded and decoded with reference to the image of the base view (images of other non-base views may also be referred to).

FIG. 25 is a block diagram illustrating a schematic configuration of an image encoding device 10v supporting the multi-view codec. Referring to FIG. 25, the image encoding device 10v includes a first layer encoding section 1c, a second layer encoding section 1d, a common memory 2, and a multiplexing section 3.

A function of the first layer encoding section 1c is the same as the function of the BL encoding section 1a described with reference to FIG. 6 except that a base view image is received as an input instead of a base layer image. The first layer encoding section 1c encodes the base view image to generate an encoded stream of a first layer. A function of the second layer encoding section 1d is the same as the function of the EL encoding section 1b described with reference to FIG. 6 except that a non-base view image is received as an input instead of an enhancement layer image. The second layer encoding section 1d encodes the non-base view image to generate the encoded stream of a second layer. The common memory 2 stores information commonly used between the layers. The multiplexing section 3 multiplexes the encoded stream of the first layer generated by the first layer encoding section 1c and the encoded stream of the second layer generated by the second layer encoding section 1d to generate a multiplexed stream of multiple layers.

FIG. 26 is a block diagram illustrating a schematic configuration of an image decoding device 60v supporting the multi-view codec. Referring to FIG. 26, the image decoding device 60v includes an inverse multiplexing section 5, a first layer decoding section 6c, a second layer decoding section 6d, and a common memory 7.

The inverse multiplexing section 5 inversely multiplexes the multiplexed stream of the multiple layers into the encoded stream of the first layer and the encoded stream of the second layer. A function of the first layer decoding section 6c is the same as the function of the BL decoding section 6a described with reference to FIG. 7 except that the encoded stream obtained by encoding the base view image is received as an input instead of the base layer image. The first layer decoding section 6c decodes the base view image from the encoded stream of the first layer. A function of the second layer decoding section 6d is the same as the function of the EL decoding section 6b described with reference to FIG. 7 except that the encoded stream obtained by encoding the non-base view image is received as an input instead of the enhancement layer image. The second layer decoding section 6d decodes the non-base view image from the encoded stream of the second layer. The common memory 7 stores information commonly used between the layers.

When the multi-view image data is encoded or decoded and the pixel attribute such as the color gamut, the dynamic range, or the bit depth is different between the views, the pixel values between the views may be predicted according to the technology of the present disclosure. Thus, by properly using a plurality of lookup tables with different granularity of the space splitting even in the multi-view codec, as in the case of the scalable video coding, it is possible to achieve optimum balance between an improvement in prediction accuracy and suppression of the encoding amount.

(2) Application to Streaming Technology

The technology of the present disclosure may be applied to a streaming protocol. For example, in Dynamic Adaptive Streaming over HTTP (MPEG-DASH), a plurality of encoded streams in which parameters such as resolutions are mutually different are prepared in advance in a streaming server. The streaming server dynamically selects data appropriate to be streamed in units of segments from the plurality of encoded streams and delivers the selected data. In such a streaming protocol, prediction between the encoded streams may be controlled according to the technology of the present disclosure.

7. Conclusion

Embodiments of the technology of the present disclosure have been described in detail above with reference to FIGS. 1 to 26. In the above-described embodiments, to perform the inter layer prediction in which the image of the second layer having the different pixel attribute from the first layer is predicted using the 3-dimensional lookup table, the second lookup table referred to when the predicted value of at least the first chroma component of the second layer is acquired is defined separately from the first lookup table referred to when the predicted value of the luma component of the second layer is acquired. The granularity of the space splitting of the second lookup table can be defined so that the granularity is different from that of the first lookup table. The third lookup table referred to when the predicted value of the second chroma component of the second layer is acquired and the third lookup table with the different granularity from at least one of the first lookup table and the second lookup table can also be defined.

According to the structure, the granularity of the space splitting of the available lookup table is not limited to the granularity of one uniform method. Accordingly, it is possible to properly use the lookup table based on the space splitting in the optimum granularity flexibly. For example, there is a case in which the lookup table having 8×2×2 (=32) finer cuboid partitions in regard to the luma component is used and, on the other hand, the lookup tables having 2×1×1 (=2) rougher cuboid partitions in regard to the first chroma component and the second chroma component are used (the number of partitions herein is merely an example and an embodiment of the technology of the present disclosure is not limited thereto). The use of the especially fine lookup table in regard to the luma component can contribute to, for example, an improvement in the prediction accuracy of the luma component in the dynamic range scalability. On the other hand, the use of the rougher lookup tables in regard to the chroma components leads to a reduction in the encoding amount of the lookup table information. Thus, according to the above-described structure, it is possible to avoid a disadvantage in which the granularity of the space splitting of the lookup table is too rough or finer than necessary in regard to a part of the color components. Consequently, it is possible to achieve the optimum balance between the improvement in the prediction accuracy and the suppression of the encoding amount.

As one example, an additional parameter indicating whether information defining another lookup table is encoded may be encoded and decoded. In the example, by changing a value of the additional parameter, it is possible to adaptively increase or decrease a variation in the granularity of the defined lookup table.

The terms "CU," "PU," and "TU" described in the present specification refer to logical units that also include a syntax associated with the individual block in HEVC. In the case of interest in only individual blocks as parts of an image, the blocks may be substituted with the terms "coding block (CB)," "prediction block (PB)," and "transform block (TB)". A CB is formed by splitting a coding tree block (CTB) in a quad-tree form hierarchically. The entirety of one quad-tree corresponds to a CTB and a logical unit corresponding to a CTB is referred to as a coding tree unit (CTU). A CTB and a CB in HEVC have a role similar to a macro block in H.264/AVC in terms of processing units of encoding processes. However, a CTB and a CB are different from a macro block in that sizes of CTBs and CBs are not fixed (the size of a macro block is normally 16×16 pixels). The size of a CTB is selected from 16×16 pixels, 32×32 pixels, and 64×64 pixels and is designated by a parameter in an encoded stream. The size of a CB can vary according to the depth at which a CTB is split.

The description has been made chiefly for the example in which information on interlayer prediction is multiplexed in the header of an encoded stream, and transmitted from the encoding side to the decoding side. However, a technique of transmitting such information is not limited to this example. For example, the information is not multiplexed into an encoded bit stream, but may be transmitted or recorded as separate data associated with the encoded bit stream. The term "associate" means that an image (which may also be a part of an image such as a slice and a block) included in the bit stream may be linked with information corresponding to the image at the time of decoding. That is, the information may be transmitted over a transmission path different from that of an image (or a bit stream). The information may also be recorded in a recording medium different from that of an image (or a bit stream) (or a different recording area in the same recording medium). The information and the image (or the bit stream) may be further associated with each other in given units such as multiple frames, one frame, and a part of a frame.

A series of control processes executed in each device described in the present specification may be realized using one of software, hardware, and a combination of software and hardware. For example, a software program is stored in advance in a storage medium installed inside or outside each device. For example, each program is read to a random access memory (RAM) at the time of execution of the program and is executed by a processor such as a central processing unit (CPU).

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured below.

(1)

An image processing device including:

circuitry configured to predict, from an image of a first layer, an image of a second layer having a different pixel attribute from the first layer, by using a lookup table in which a combination of a luma component, a first chroma component, and a second chroma component of the first layer is mapped to a predicted pixel value of the second layer corresponding to the combination, wherein a predicted value of a luma component of the second layer is acquired by using a first lookup table, and a predicted value of a first chroma component of the second layer is acquired by using a second lookup table with granularity different from granularity of the first lookup table.

(2)

The image processing device according to (1), wherein the circuitry is further configured to:

decode first granularity information defining the granularity of the first lookup table; and decode second granularity information defining the granularity of the second lookup table.

(3)

The image processing device according to (1) or (2), wherein the circuitry is further configured to:

encode first granularity information defining the granularity of the first lookup table; and encode second granularity information defining the granularity of the second lookup table.

(4)

The image processing device according to any of (1) to (3), wherein a predicted value of the second chroma component of the second layer further is acquired using a third lookup table with granularity different from the granularity of the first lookup table and the granularity of the second lookup table.

(5)

The image processing device according to any of (1) to (4), wherein the first granularity information includes a flag set defining splitting of a color space of a base layer in regard to the first lookup table, and wherein the second granularity information includes a flag set defining splitting of the color space of the base layer in regard to the second lookup table.

(6)

The image processing device according to any of (1) to (5), wherein the first granularity information is encoded along with predicted value information corresponding to each cuboid partition of the first lookup table, and wherein the second granularity information is encoded along with predicted value information corresponding to each cuboid partition of the second lookup table.

(7)

The image processing device according to any of (1) to (6), wherein the predicted value information indicates a vertex position of a partial space of a color space of an enhancement layer corresponding to each cuboid partition.

(8)

The image processing device according to any of (1) to (7), wherein the second granularity information is decoded when a parameter indicating that the second granularity information is encoded separately from the first granularity information is decoded.

(9)

The image processing device according to any of (1) to (8), wherein the pixel attribute includes at least one of a color gamut, a bit depth, and a dynamic range.

(10)

The image processing device according to any of (1) to (9), wherein the first granularity information corresponds to one of a Y, U and V color component, and the second granularity information corresponds to another one of the Y, U and V color component different than the one of the Y, U and V color component to which the first granularity information corresponds.

(11)

An image processing method that is performed by an image processing device which predicts, from an image of a first layer, an image of a second layer having a different pixel attribute from the first layer, the image processing method including:

acquiring a predicted value of a luma component of the second layer by using a first lookup table in which a combination of a luma component, a first chroma component, and a second chroma component of the first layer is mapped to a predicted pixel value of the second layer corresponding to the combination; and acquiring a predicted value of a first chroma component of the second layer by using a second lookup table with granularity different from granularity of the first lookup table.

(12)

A non-transitory computer-readable medium having embodied thereon a program, which when executed by a computer causes the computer to execute an image processing method of predicting, from an image of a first layer, an image of a second layer having a different pixel attribute from the first layer, the image processing method including:

acquiring a predicted value of a luma component of the second layer by using a first lookup table in which a combination of a luma component, a first chroma component, and a second chroma component of the first layer is mapped to a predicted pixel value of the second layer corresponding to the combination; and acquiring a predicted value of a first chroma component of the second layer by using a second lookup table with granularity different from granularity of the first lookup table.

(13)

An image processing device including:

a prediction section configured to predict an image of a second layer having a different pixel attribute from a first layer from an image of the first layer using a lookup table in which a combination of a luma component, a first chroma component, and a second chroma component of the first layer is mapped to a predicted pixel value of the second layer corresponding to the combination, wherein the prediction section acquires a predicted value of the luma component of the second layer using a first lookup table and acquires a predicted value of the first chroma component of the second layer using a second lookup table with granularity different from granularity of the first lookup table.

(14)

The image processing device according to (13), further including:
a decoding section configured to decode first granularity information defining the granularity of the first lookup table and second granularity information defining the granularity of the second lookup table.

(15)

The image processing device according to (13), further including:
an encoding section configured to encode first granularity information defining the granularity of the first lookup table and second granularity information defining the granularity of the second lookup table.

(16)

The image processing device according to (14) or (15), wherein the prediction section acquires a predicted value of the second chroma component of the second layer further using a third lookup table with granularity different from the granularity of the first lookup table and the granularity of the second lookup table.

(17)

The image processing device according to any one of (14) to (16),
wherein the first granularity information includes a flag set defining splitting of a color space of a base layer in regard to the first lookup table, and
wherein the second granularity information includes a flag set defining splitting of the color space of the base layer in regard to the second lookup table.

(18)

The image processing device according to (17),
wherein the first granularity information is encoded along with predicted value information corresponding to each cuboid partition of the first lookup table, and wherein the second granularity information is encoded along with predicted value information corresponding to each cuboid partition of the second lookup table.

(19)

The image processing device according to (18), wherein the predicted value information indicates a vertex position of a partial space of a color space of an enhancement layer corresponding to each cuboid partition.

(20)

The image processing device according to (14), wherein the decoding section decodes the second granularity information when a parameter indicating that the second granularity information is encoded separately from the first granularity information is decoded.

(21)

The image processing device according to any one of (13) to (20), wherein the pixel attribute includes at least one of a color gamut, a bit depth, and a dynamic range.

(22)

An image processing method that is performed by an image processing device which predicts an image of a second layer having a different pixel attribute from a first layer from an image of the first layer, the image processing method including:
acquiring a predicted value of the luma component of the second layer using a first lookup table in which a combination of a luma component, a first chroma component, and a second chroma component of the first layer is mapped to a predicted pixel value of the second layer corresponding to the combination; and
acquiring a predicted value of the first chroma component of the second layer using a second lookup table with granularity different from granularity of the first lookup table.

REFERENCE SIGNS LIST 10, 10v image encoding device (image processing device)
16 lossless encoding section
40 inter layer prediction section
45 lookup table buffer
60, 60v image decoding device (image processing device)
62 lossless decoding section
90 inter layer prediction section
95 lookup table buffer

The invention claimed is:
1. An image processing device comprising:
circuitry configured to
predict, from an image of a first layer, an image of a second layer having a different pixel attribute from the first layer, by using a lookup table in which a combination of a luma component, a first chroma component, and a second chroma component of the first layer is mapped to a predicted pixel value of the second layer corresponding to the combination,
decode first granularity information defining granularity of a first 3-dimensional lookup table, and
decode second granularity information defining granularity of a second 3-dimensional lookup table,
wherein a predicted value of a luma component of the second layer is acquired by using the first 3-dimensional lookup table, and a predicted value of a first chroma component of the second layer is acquired by using the second 3-dimensional lookup table,
wherein the granularity of the second 3-dimensional lookup table is different from the granularity of the first 3-dimensional lookup table,
wherein the first granularity information includes a first flag set defining splitting of a color space of a base layer in regard to the first 3-dimensional lookup table, and
wherein the second granularity information includes a second flag set defining splitting of the color space of the base layer in regard to the second 3-dimensional lookup table.

2. The image processing device according to claim 1, wherein the circuitry is further configured to:
encode the first granularity information defining the granularity of the first 3-dimensional lookup table; and
encode the second granularity information defining the granularity of the second 3-dimensional lookup table.

3. The image processing device according to claim 1, wherein a predicted value of a second chroma component of the second layer is acquired using a third 3-dimensional lookup table with granularity different from the granularity of the first 3-dimensional lookup table and the granularity of the second 3-dimensional lookup table.

4. The image processing device according to claim 1, wherein the first granularity information is encoded along with predicted value information corresponding to each cuboid partition of the first 3-dimensional lookup table, and wherein the second granularity information is encoded along with predicted value information corresponding to each cuboid partition of the second 3-dimensional lookup table.

5. The image processing device according to claim 4, wherein the predicted value information indicates a vertex position of a partial space of a color space of an enhancement layer corresponding to each cuboid partition.

6. The image processing device according to claim 1, wherein the second granularity information is decoded when a parameter indicating that the second granularity information is encoded separately from the first granularity information is decoded.

7. The image processing device according to claim 1, wherein the pixel attribute includes at least one of a color gamut, a bit depth, and a dynamic range.

8. The image processing device according to claim 1, wherein the first granularity information corresponds to one of a Y, U and V color component, and the second granularity information corresponds to another one of the Y, U and V color component different than the one of the Y, U and V color component to which the first granularity information corresponds.

9. An image processing method that is performed by an image processing device which predicts, from an image of a first layer, an image of a second layer having a different pixel attribute from the first layer, the image processing method comprising:
  decoding first granularity information defining granularity of a first 3-dimensional lookup table;
  decoding second granularity information defining granularity of a second 3-dimensional lookup table;
  acquiring a predicted value of a luma component of the second layer by using the first 3-dimensional lookup table in which a combination of a luma component, a first chroma component, and a second chroma component of the first layer is mapped to a predicted pixel value of the second layer corresponding to the combination; and
  acquiring a predicted value of a first chroma component of the second layer by using the second 3-dimensional lookup table,
  wherein the granularity of the second 3-dimensional lookup table is different from the granularity of the first 3-dimensional lookup table,
  wherein the first granularity information includes a first flag set defining splitting of a color space of a base layer in regard to the first 3-dimensional lookup table, and
  wherein the second granularity information includes a second flag set defining splitting of the color space of the base layer in regard to the second 3-dimensional lookup table.

10. A non-transitory computer-readable medium having embodied thereon a program, which when executed by a computer causes the computer to execute an image processing method of predicting, from an image of a first layer, an image of a second layer having a different pixel attribute from the first layer, the image processing method comprising:
  decoding first granularity information defining granularity of a first 3-dimensional lookup table;
  decoding second granularity information defining granularity of a second 3-dimensional lookup table;
  acquiring a predicted value of a luma component of the second layer by using the first 3-dimensional lookup table in which a combination of a luma component, a first chroma component, and a second chroma component of the first layer is mapped to a predicted pixel value of the second layer corresponding to the combination; and
  acquiring a predicted value of a first chroma component of the second layer by using the second 3-dimensional lookup table,
  wherein the granularity of the second 3-dimensional lookup table is different from the granularity of the first 3-dimensional lookup table,
  wherein the first granularity information includes a first flag set defining splitting of a color space of a base layer in regard to the first 3-dimensional lookup table, and
  wherein the second granularity information includes a second flag set defining splitting of the color space of the base layer in regard to the second 3-dimensional lookup table.

* * * * *